May 16, 1961 F. P. SHARPE 2,983,999
AUTOMATIC BEARING CUP AND STUD ASSEMBLING MACHINE
Filed April 8, 1957 16 Sheets-Sheet 1

INVENTOR.
FREDERICK P. SHARPE
BY Whittemore,
Hulbert & Belknap
ATTORNEYS

May 16, 1961 F. P. SHARPE 2,983,999
AUTOMATIC BEARING CUP AND STUD ASSEMBLING MACHINE
Filed April 8, 1957 16 Sheets-Sheet 2

INVENTOR.
FREDERICK P. SHARPE
BY
Whittemore, Hulbert & Belknap
ATTORNEYS

May 16, 1961 F. P. SHARPE 2,983,999
AUTOMATIC BEARING CUP AND STUD ASSEMBLING MACHINE
Filed April 8, 1957 16 Sheets-Sheet 3

INVENTOR.
BY FREDERICK P. SHARPE
ATTORNEYS

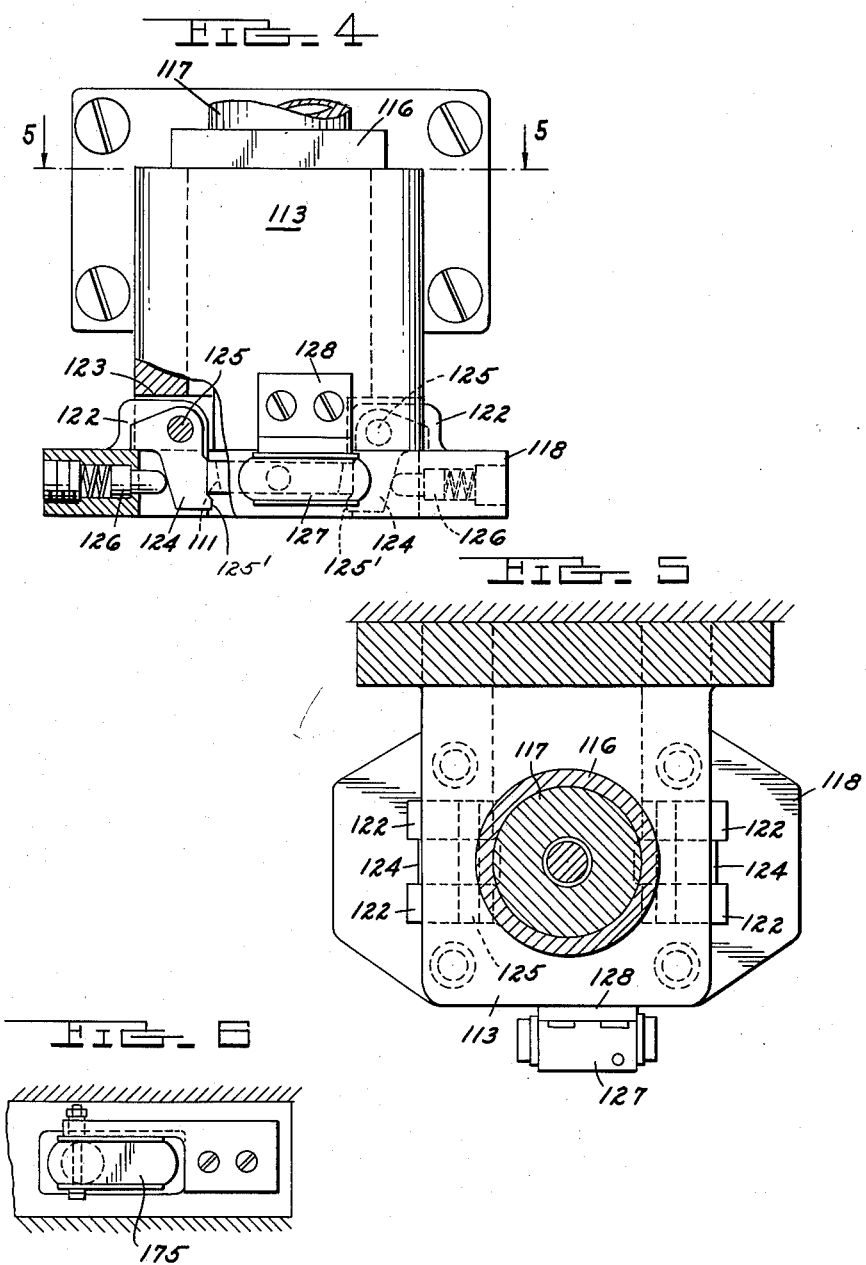

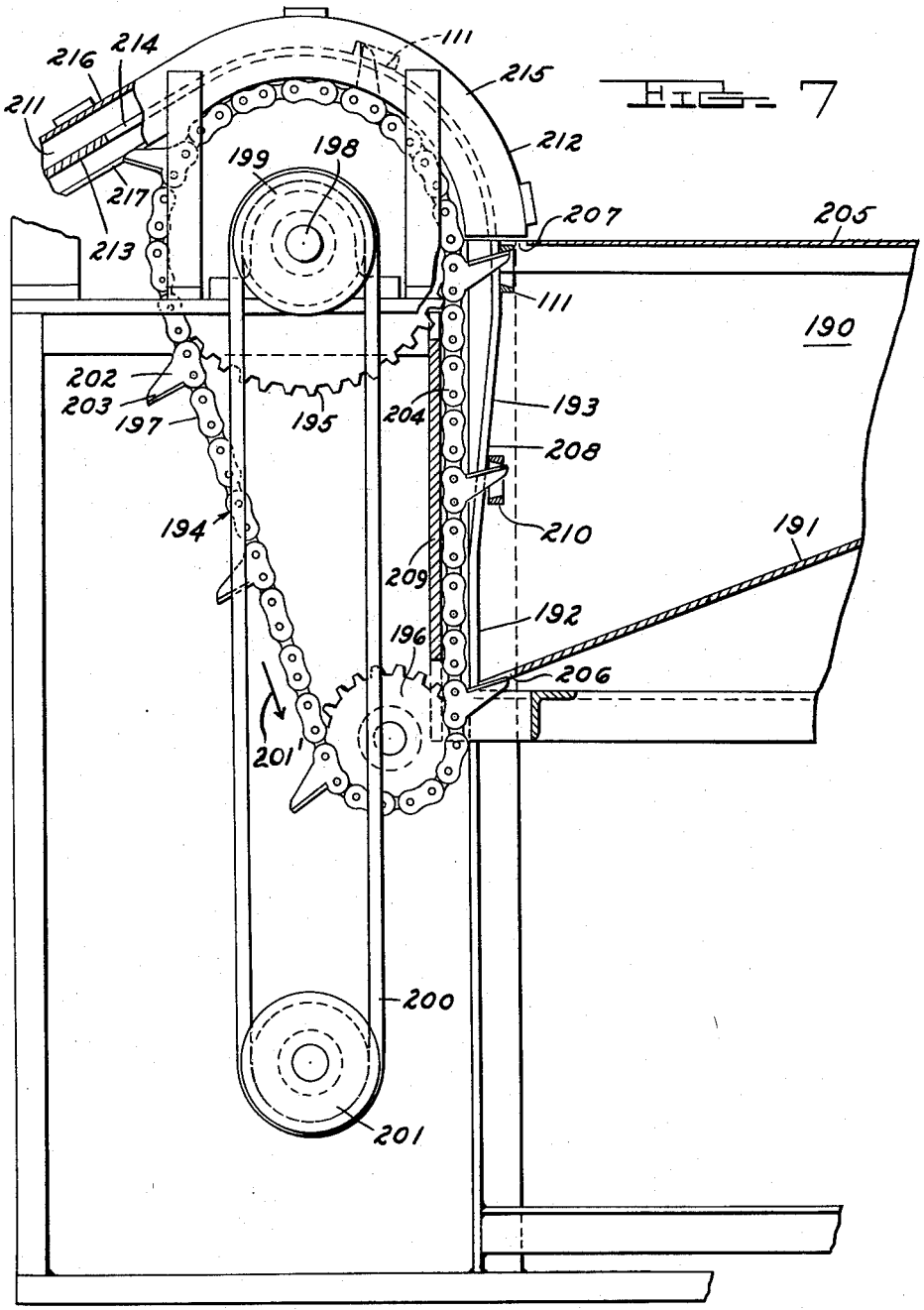

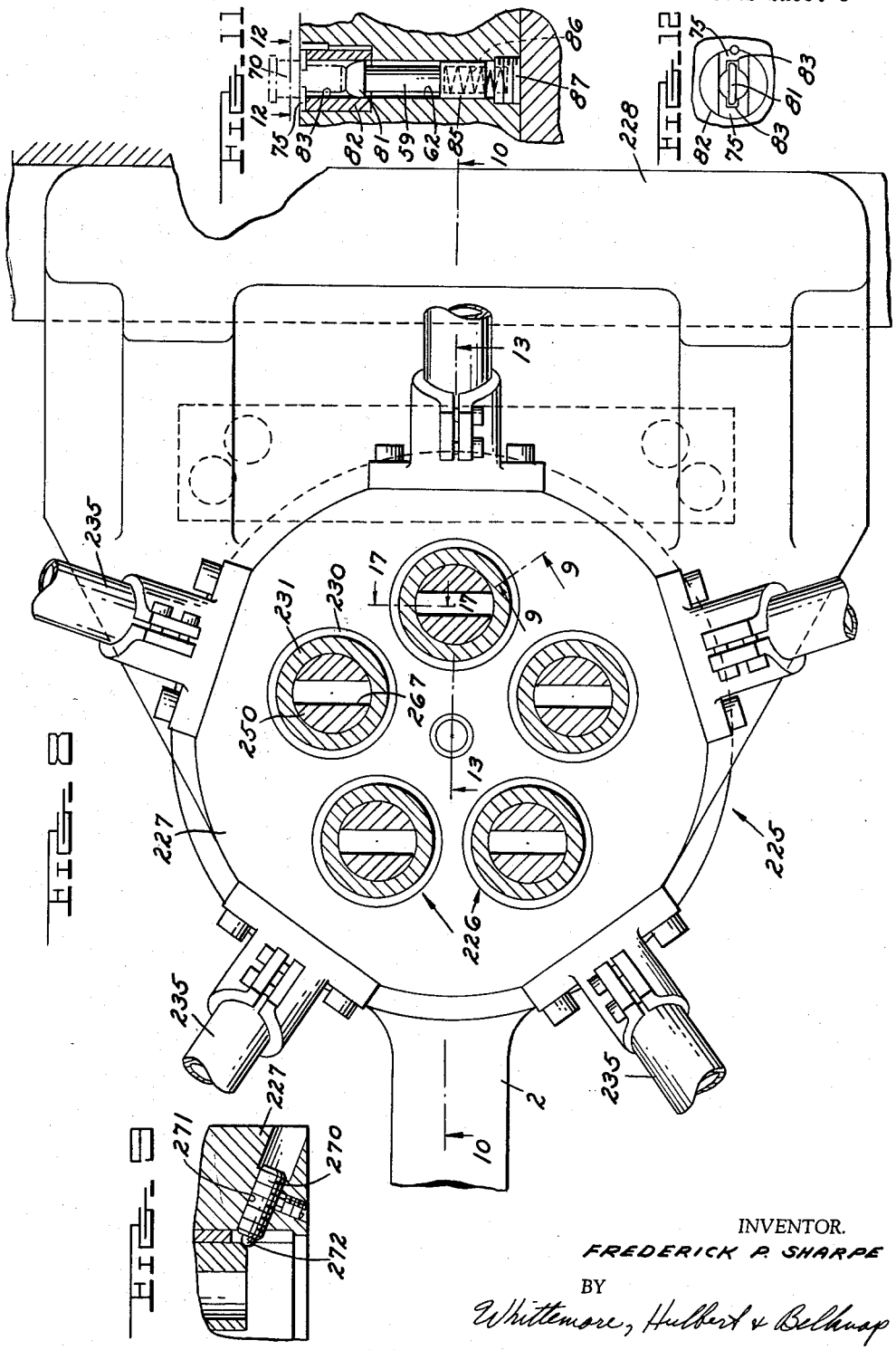

May 16, 1961     F. P. SHARPE     2,983,999
AUTOMATIC BEARING CUP AND STUD ASSEMBLING MACHINE
Filed April 8, 1957     16 Sheets-Sheet 7
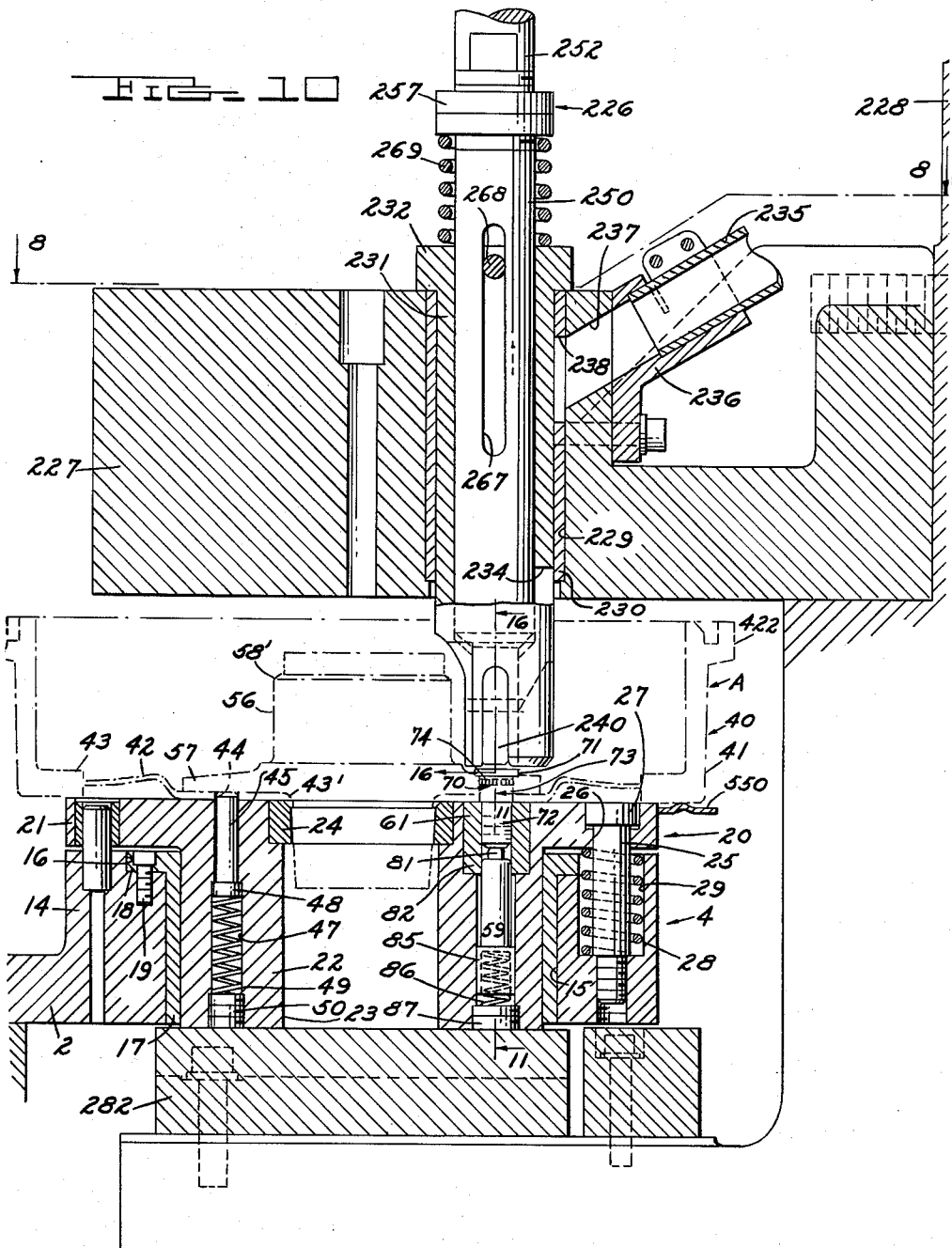
INVENTOR.
FREDERICK P. SHARPE
BY
Whittemore, Hulbert & Belknap
ATTORNEYS

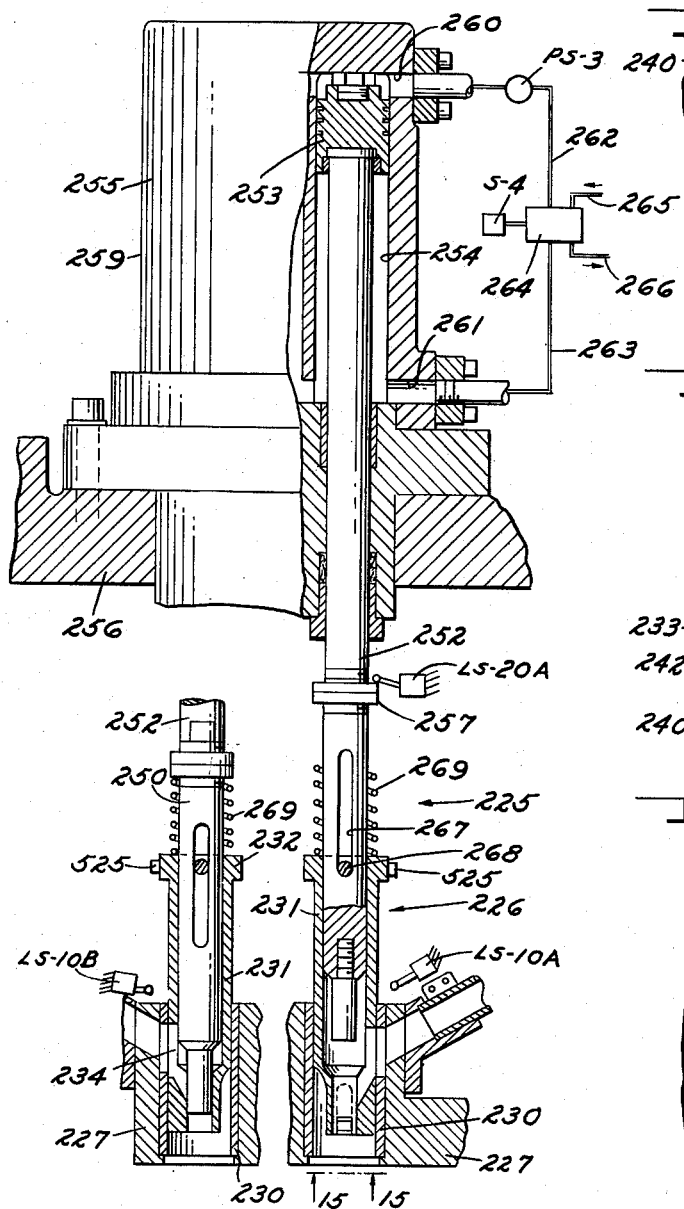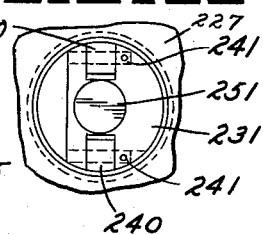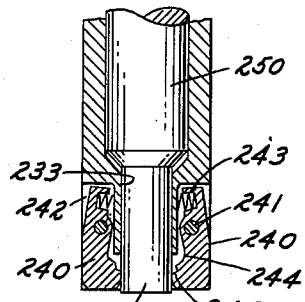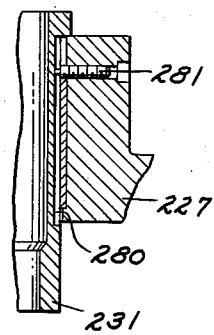

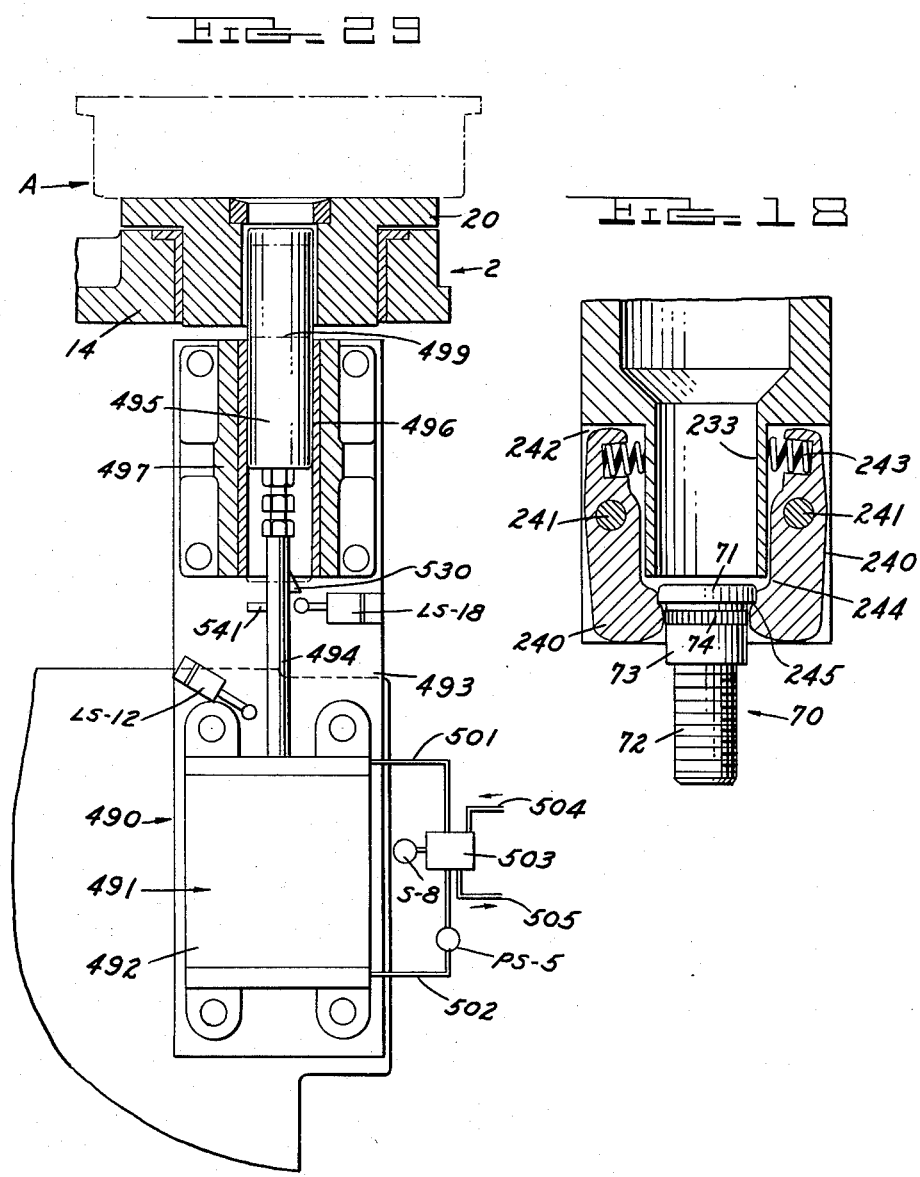

May 16, 1961 F. P. SHARPE 2,983,999
AUTOMATIC BEARING CUP AND STUD ASSEMBLING MACHINE
Filed April 8, 1957 16 Sheets-Sheet 10
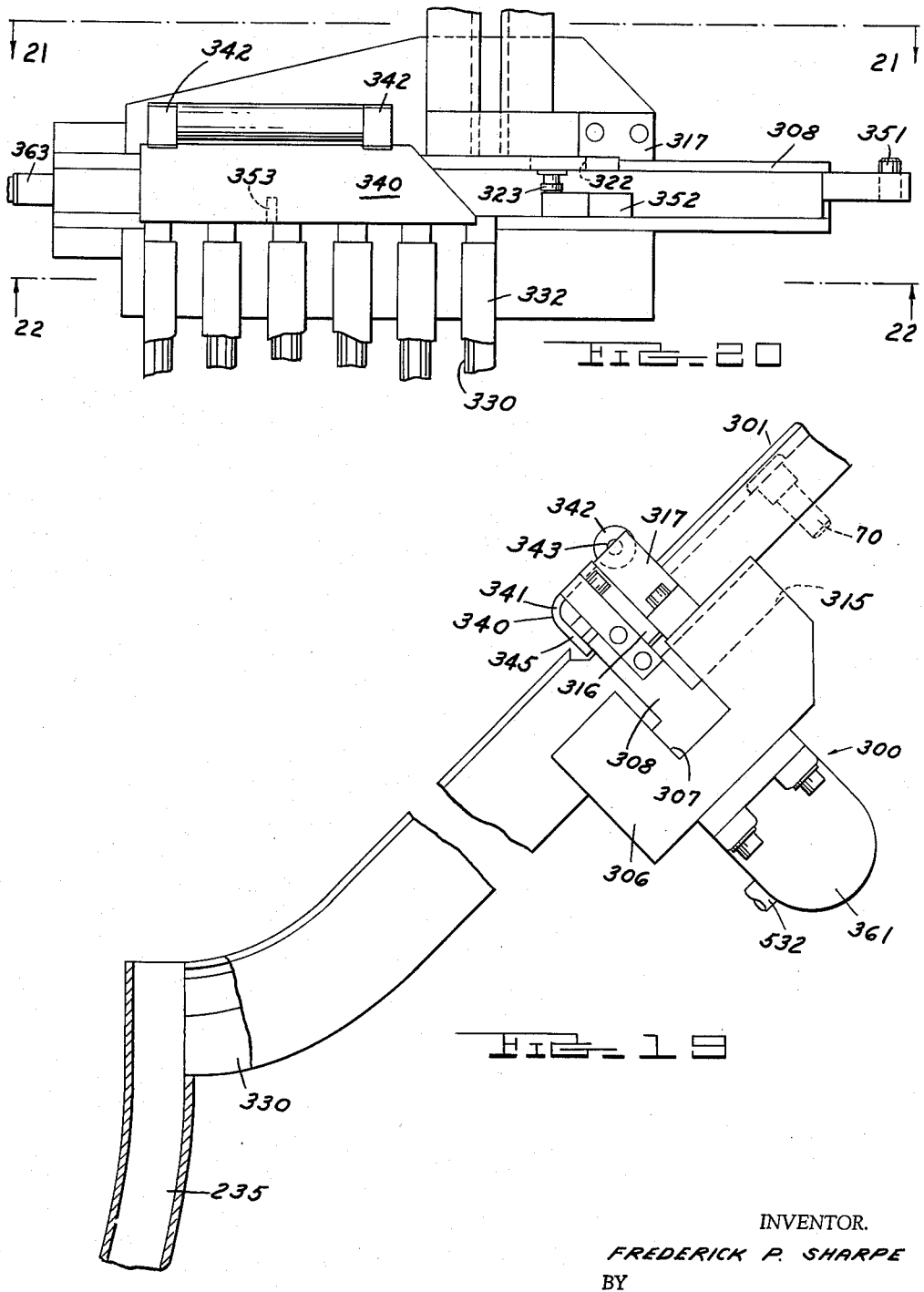
INVENTOR.
FREDERICK P. SHARPE
BY
Whittemore, Hulbert & Belknap
ATTORNEYS May 16, 1961 F. P. SHARPE 2,983,999
AUTOMATIC BEARING CUP AND STUD ASSEMBLING MACHINE
Filed April 8, 1957 16 Sheets-Sheet 11
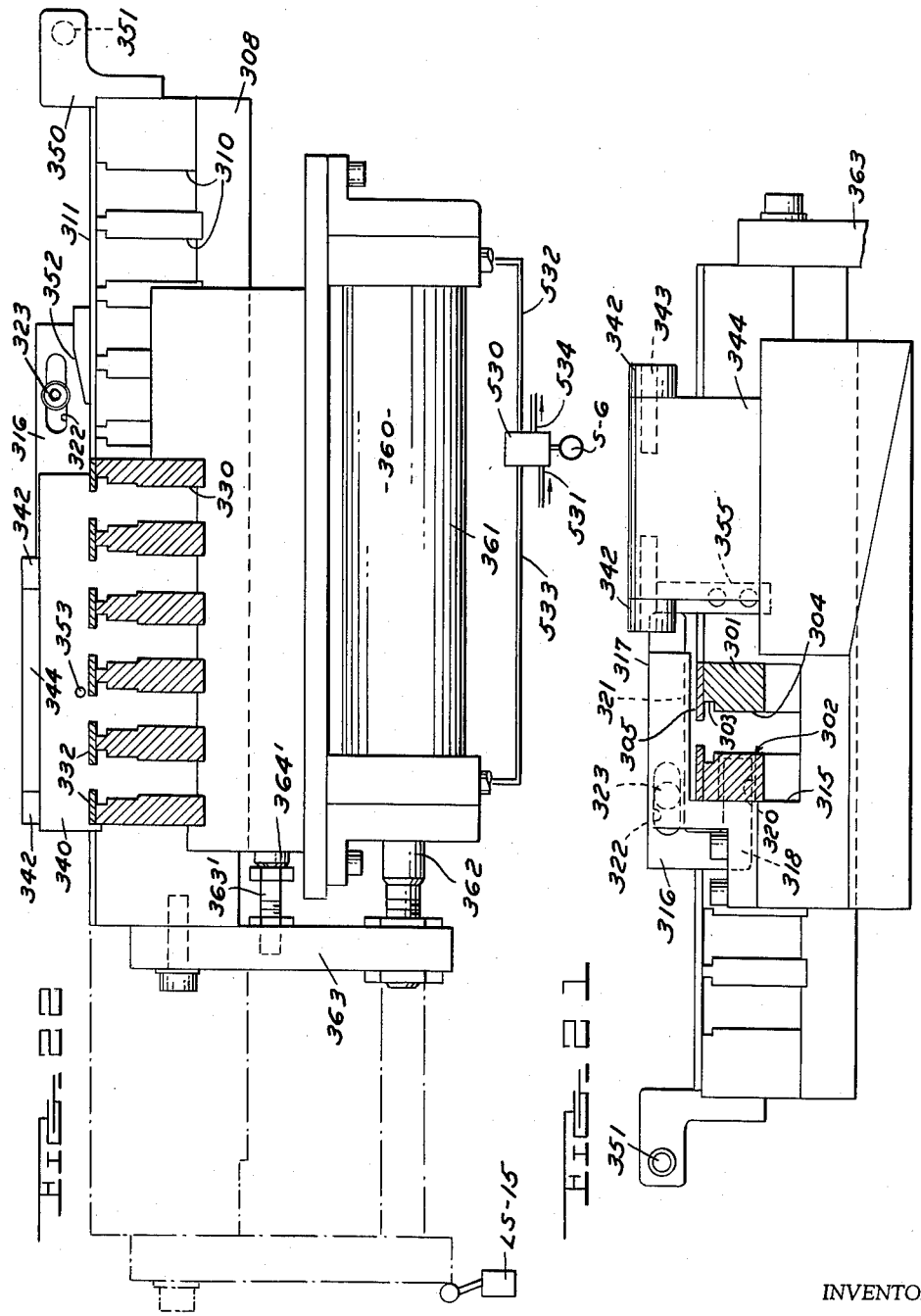
INVENTOR.
FREDERICK P. SHARPE
BY
Whittemore, Hulbert & Belknap
ATTORNEYS

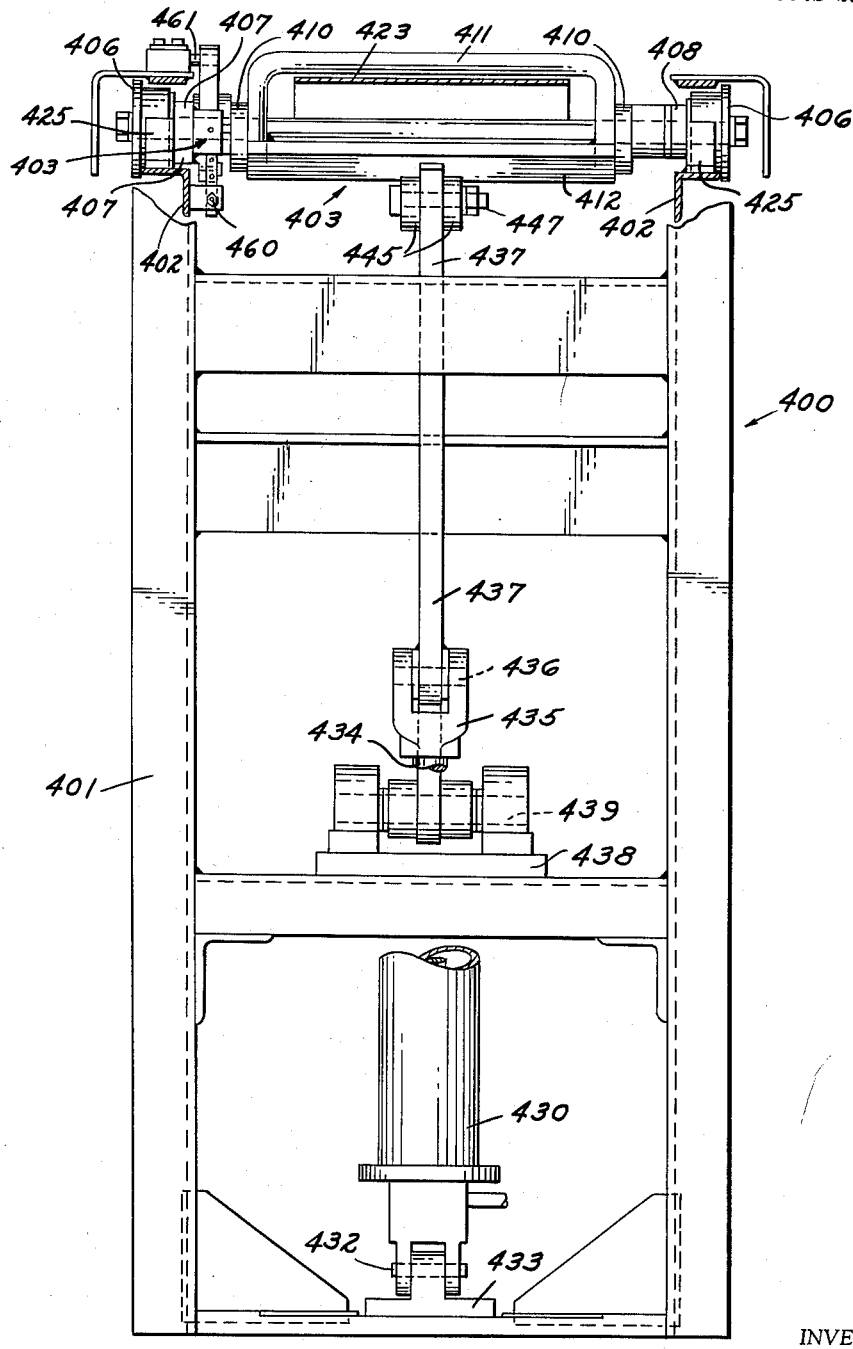

May 16, 1961 F. P. SHARPE 2,983,999
AUTOMATIC BEARING CUP AND STUD ASSEMBLING MACHINE
Filed April 8, 1957 16 Sheets-Sheet 13
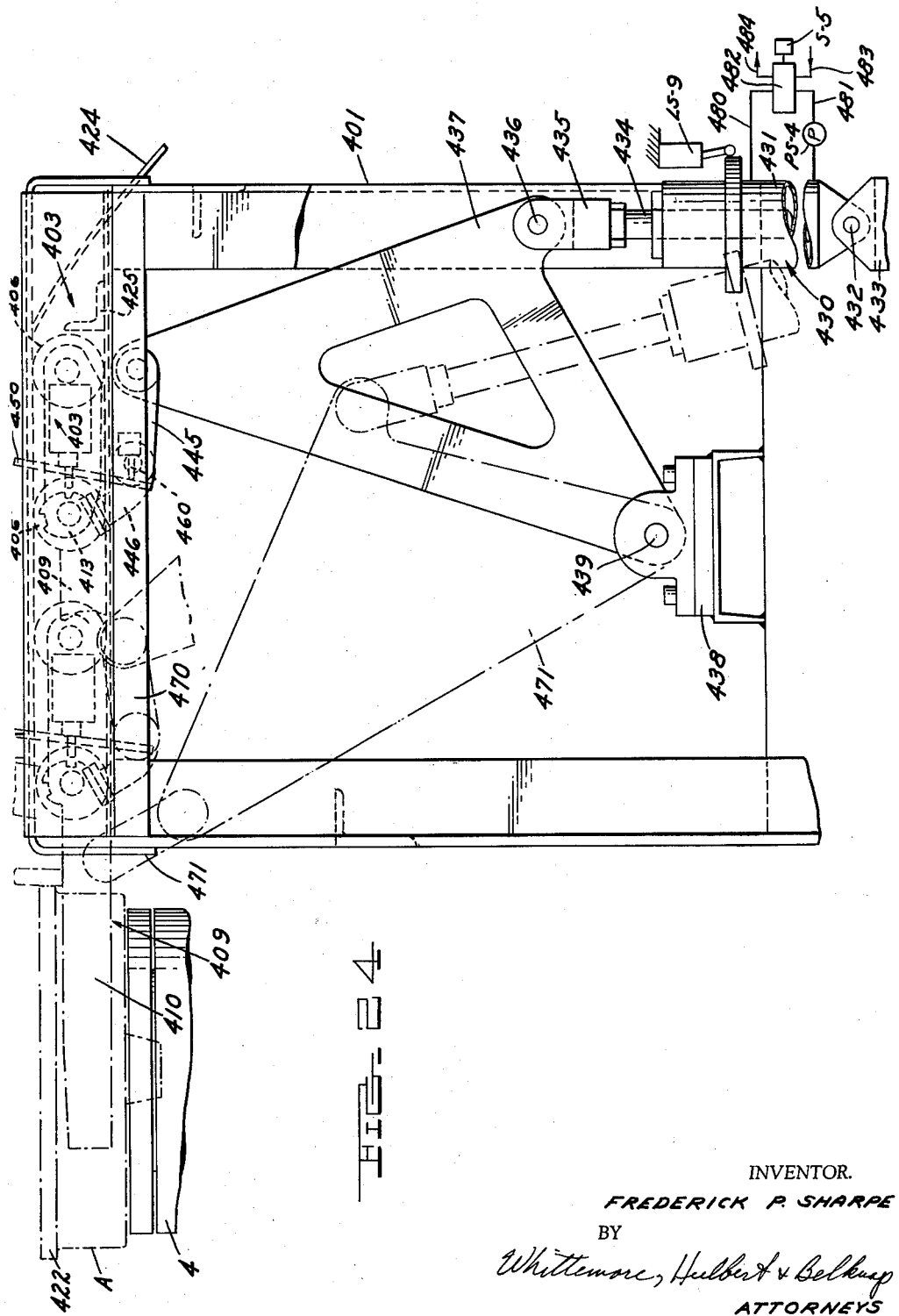
INVENTOR.
FREDERICK P. SHARPE
BY
Whittemore, Hulbert & Belknap
ATTORNEYS

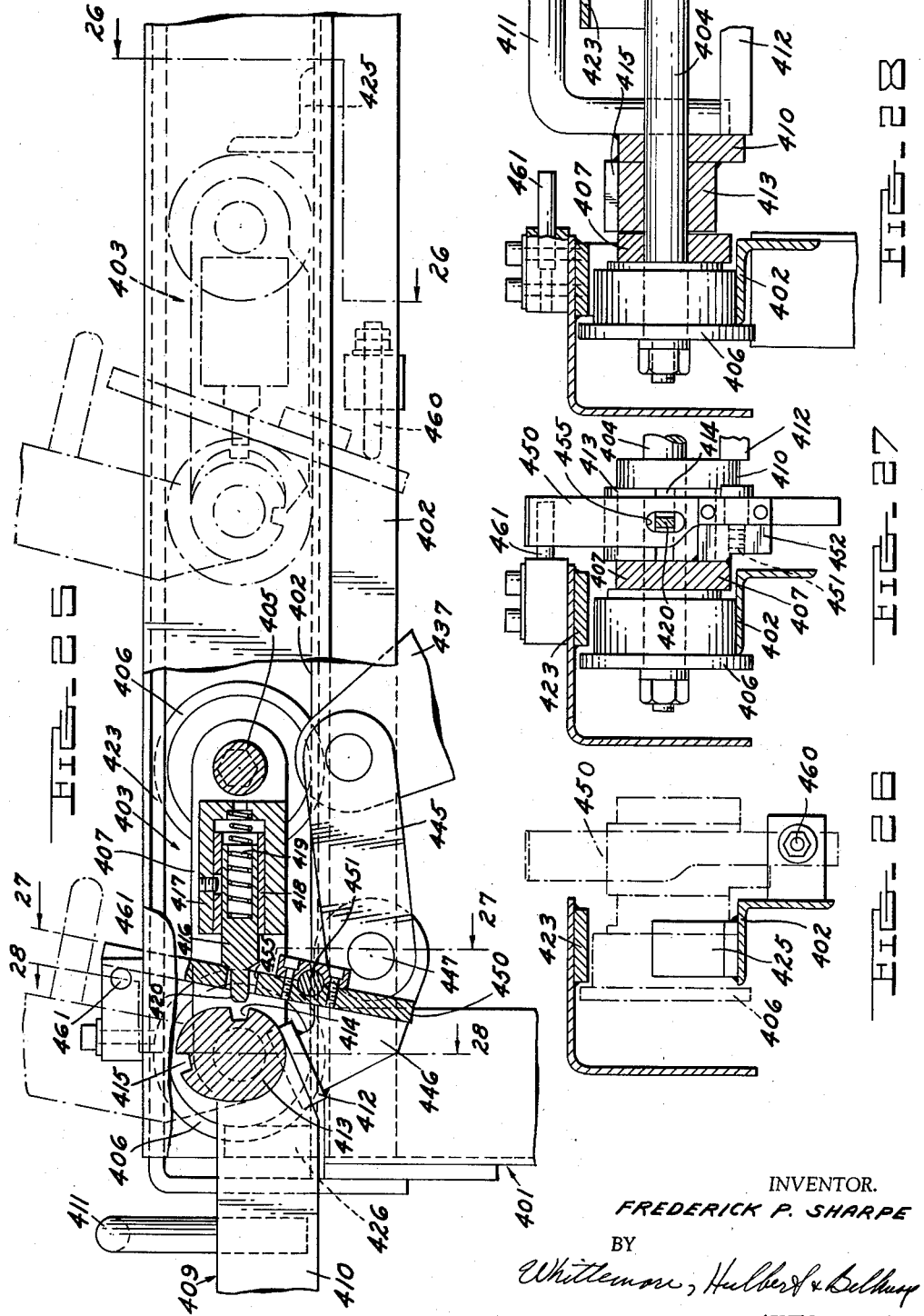

May 16, 1961 F. P. SHARPE 2,983,999
AUTOMATIC BEARING CUP AND STUD ASSEMBLING MACHINE
Filed April 8, 1957 16 Sheets-Sheet 15

INVENTOR.
FREDERICK P. SHARPE
BY
Whittemore, Hulbert & Belknap
ATTORNEYS

May 16, 1961 F. P. SHARPE 2,983,999
AUTOMATIC BEARING CUP AND STUD ASSEMBLING MACHINE
Filed April 8, 1957 16 Sheets-Sheet 16
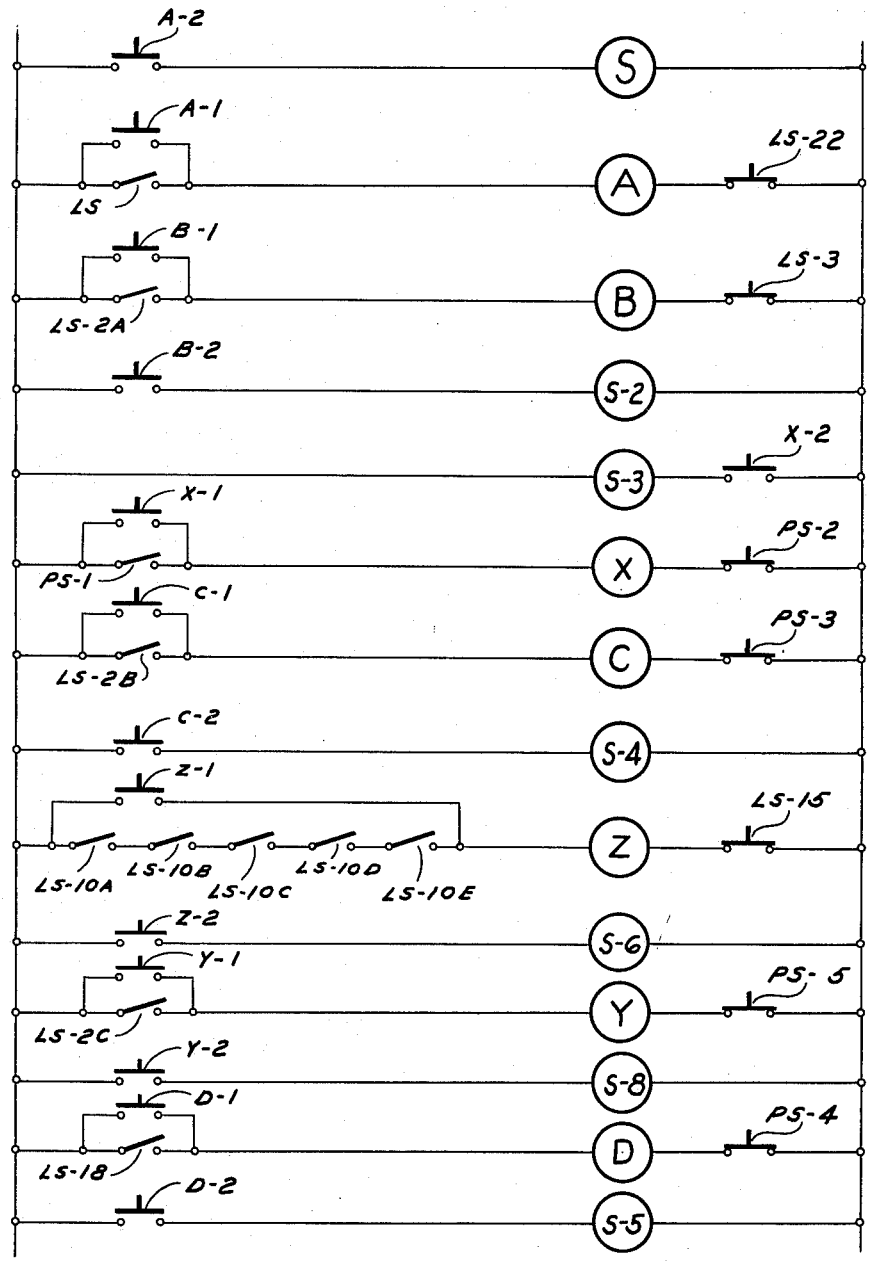
INVENTOR.
FREDERICK P. SHARPE
BY
Whittemore, Hulbert & Belknap
ATTORNEYS United States Patent Office 2,983,999
Patented May 16, 1961

2,983,999
AUTOMATIC BEARING CUP AND STUD ASSEMBLING MACHINE

Frederick P. Sharpe, Dearborn, Mich., assignor to Kelsey-Hayes Company, Detroit, Mich., a corporation of Delaware Filed Apr. 8, 1957, Ser. No. 651,209
9 Claims. (Cl. 29—208)

This invention relates to a bearing cup and stud assembling machine and refers more particularly to a machine for securing together a wheel hub and brake drum assembly and also for assembling bearing cups with the hub of the assembly.

The invention has for one of its objects to provide such a machine which is automatic in operation.

The invention has for another object to provide intermittently operated apparatus for assembling bearing cups with the hub of a hub and drum assembly and securing together the hub and drum of the assembly by studs inserted thereinto.

The invention has for a further object to provide bearing cup assembling and stud inserting mechanism at spaced stations along the path of movement of a carrier for the hub and drum assemblies, which carrier is intermittently moved past the stations for operation of the mechanisms upon the assemblies at each station between the intervals of intermittent movement.

With these and other objects in view, the invention resides in the novel features of construction and combinations of parts as more fullly hereinafter set forth.

In the drawings:

Figure 4 is an elevational view, partly in section, looking in the direction of the arrow 4 in Figure 3.

Figure 5 is a sectional view taken on the line 5—5 of Figure 4.

Figure 6 is a view taken on the line 6—6 of Figure 3.

Figure 7 illustrates apparatus associated with the machine, including a bearing cup hopper and means for delivering bearing cups from the hopper to the machine.

Figure 8 is a sectional view taken on the line 8—8 of Figure 10, showing the stud inserting apparatus.

Figure 9 is a sectional view showing the means for holding up the stud holder, and taken on line 9—9 of Figure 8.

Figure 10 is a sectional view taken on the line 10—10 of Figure 8.

Figure 11 is a sectional view taken along the line 11—11 of Figure 10.

Figure 12 is a view taken along the line 12—12 of Figure 11.

Figure 13 is a sectional view taken along the line 13—13 of Figure 8.

Figure 14 is a fragmentary view of portions of Figure 13, showing the parts in another position.

Figure 15 is a view taken along the line 15—15 of Figure 13.

Figure 16 is a sectional view taken along the line 16—16 of Figure 10.

Figure 17 is a sectional view taken on the line 17—17 of Figure 8.

Figure 18 is similar to Figure 16 but shows a stud supported in the stud holder.

Figure 19 is a side elevational view of the stud separating apparatus.

Figure 20 is a plan view thereof.

Figures 21 and 22 are sectional views on the lines 21—21 and 22—22, respectively, of Figure 20.

Figure 2:
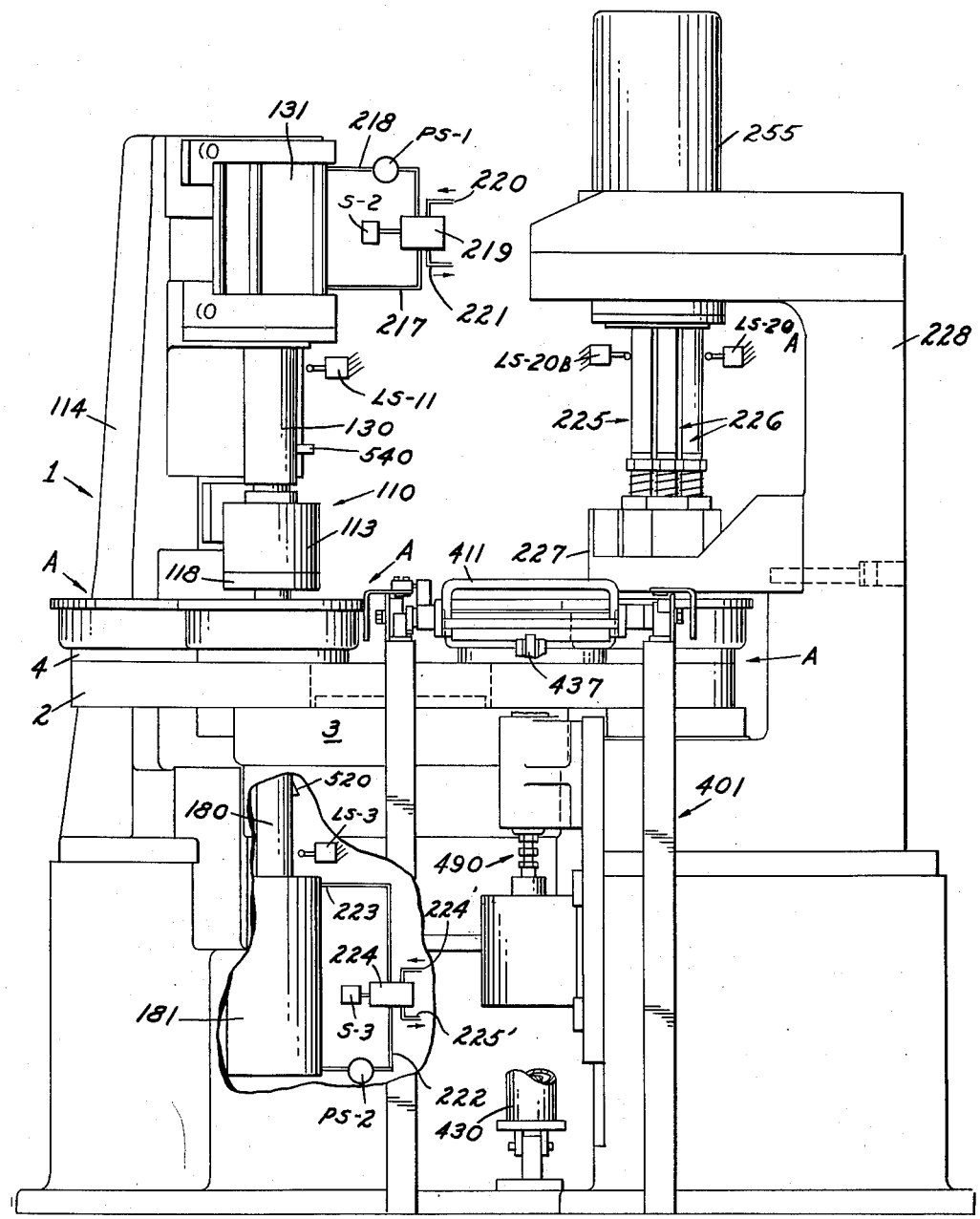
Figure 2 is a side elevational view of the machine shown in Figure 1, with the stud chutes removed for clarity.

Figure 23 is an enlarged elevation of the unloading apparatus shown in Figure 2.

Figure 1:
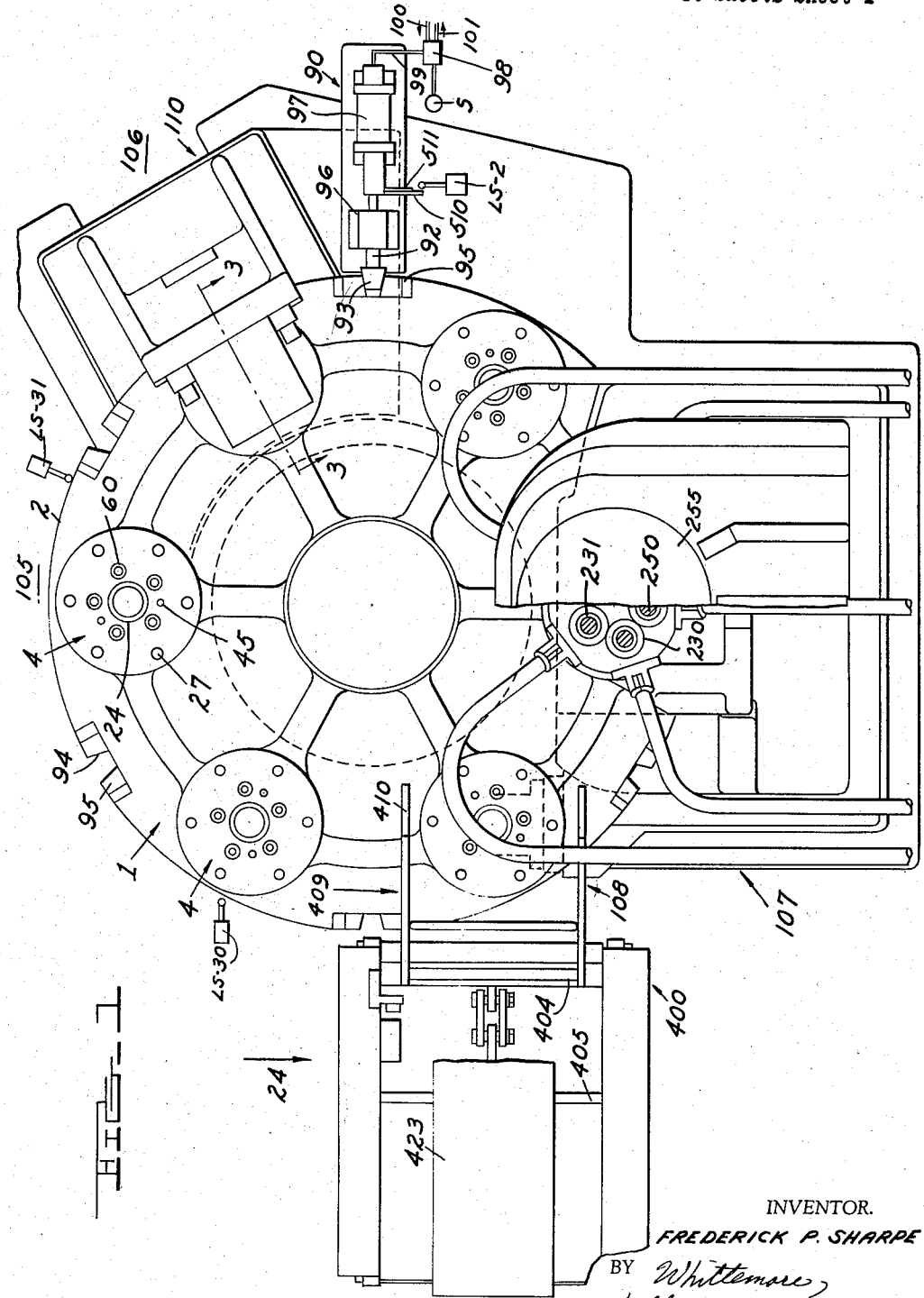
Figure 1 is a top plan view of a machine embodying the invention.

Figure 24 is a side elevational view of the apparatus shown in Figure 23, looking in the direction of the arrow 24 in Figure 1.

Figure 25 is an enlargement, partly in section, of a portion of the apparatus of Figure 24.

Figures 26, 27 and 28 are sectional views taken on the lines 26—26, 27—27 and 28—28 respectively, of Figure 25.

Figure 29 is an elevational view partly in section, of the kicker mechanism.

Figure 30:
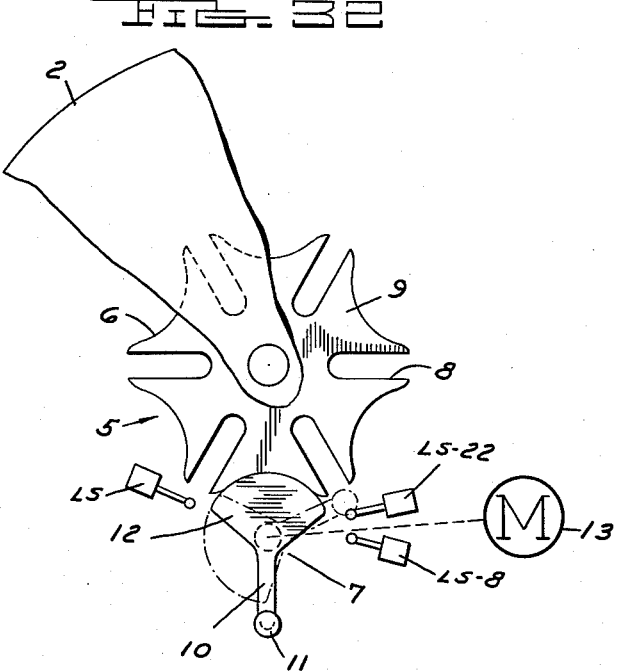

Figure 30 is a diagrammatic view of the drive mechanism for the turntable.

Figure 32:
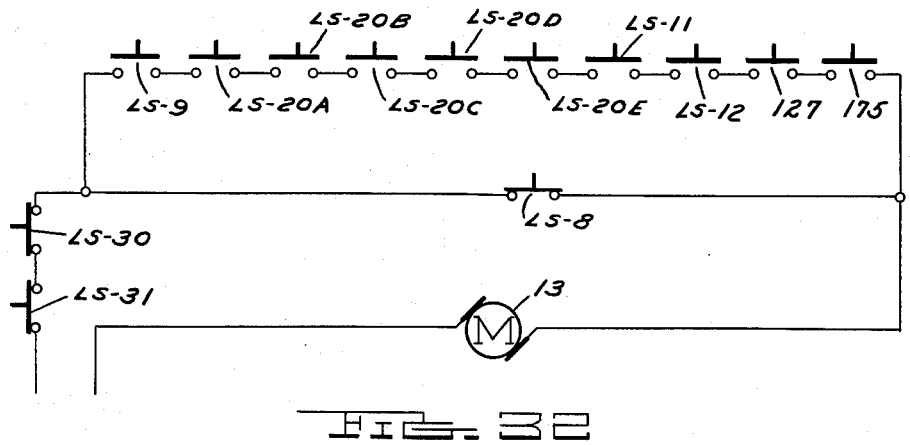

Figures 31 and 32 are wiring diagrams.

Referring more particularly to the drawings, the machine is generally indicated at 1 in Figs. 1 and 2 and comprises a rotatable generally horizontally disposed turntable 2 supported for rotation on the frame structure 3. The machine is designed to assemble hub and drum assemblies A with studs, and to insert bearing cups into the hub of each assembly. The turntable has on its upper surface a plurality of angularly spaced hub and drum assembly supports 4. Six supports 4 are provided which are located adjacent to the outer edge of the turntable and are spaced apart from each other equal distances.

The turntable 2 is rotated by the power driven Geneva mechanism 5 (Fig. 30). The Geneva mechanism 5 includes a Geneva driven wheel 6 and a Geneva driving wheel 7. The driven wheel 6 has the radial slots 8 and the intermediate portions 9 formed with concave peripheries. The driving wheel 7 is provided with a radial arm 10 having a roller 11 on the outer end, and a hub 12 which is in the form of a segment of a circular disk and which has a convex periphery curved to the same radius as the concave peripheries of the spoke portions of the driven wheel. The roller 10 is engageable in the radial slots 8 and the periphery of the hub 12 fits the concave peripheries of the spoke portions 9 when the roller is disengaged from a slot. The hub is formed to clear the parts of the spoke portions immediately adjacent the slot when the roller is in engagement with the slot. There are six radial slots 8 so that for each rotation of the driving wheel 7 the driven wheel 6 is rotated through an angle of 60°. The driving wheel 7 is adapted to be continuously rotated by a motor 13. There is a direct driving connection between driven wheel 6 and the turntable 2, so that the turntable is intermittently rotated increments of 60°, which is the angular distance between the supports 4 thereon.

Figure 3:
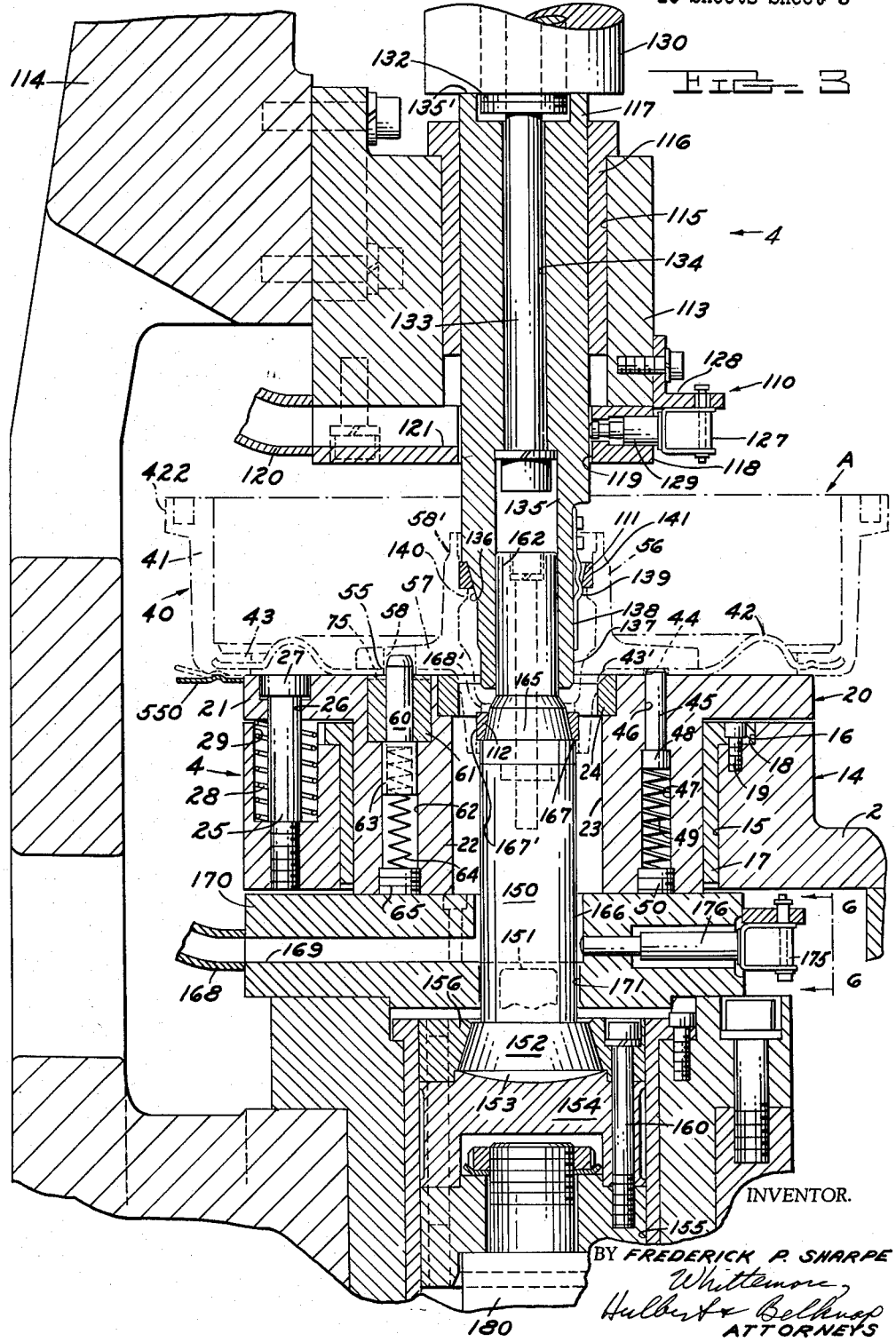
Figure 3 is a sectional view taken on the line 3—3 of Figure 1.

Each support 4 on the turntable comprises the integral circular enlargement 14 which projects upwardly from the turntable (Figs. 3 and 10). Each enlargement 14 has a central passage 15 which extends vertically therethrough from the top of the enlargement to the bottom of the turntable, the passage being counterbored at the upper end as shown a 16. A tubular bushing 17 is supported in the passage 15 and has a flange 18 at the upper end disposed in the counterbored portion 16 of the passage and secured to the enlargement 14 by the fasteners 19. Each support 4 also includes a supporting member 20 having an upper circular portion 21 and a depending circular portion 22 of reduced diameter received in the tubular bushing 17 for vertical reciprocation therein. The supporting member 20 has the central vertical through passage 23 counterbored at the upper end to receive the supporting ring 24.

Each supporting member 20 is mounted on the enlargement 14 by an annular series of bolts 25. The shanks of the bolts threadedly engage the enlargement 14 so that the bolts are rigidly secured in position on the enlargements, and the upper ends of the bolts are slidably received in passages 26 in the supporting member 20. These passages 26 are counterbored at the upper end to slidably receive the enlarged heads 27 of the bolts. Coil springs 28 encircle each bolt shank and are disposed in recesses 29 in the enlargements 14 through which the bolt shanks extend, the springs being compressed between the bottoms of the recesses and the undersides of the circular portions 21 of the supporting members 20, normally urging the supporting members upwardly to a position in which the counterbored portions of passages 26 engage the undersides of the bolt heads 27. In Figs. 3 and 10, the supporting members 20 are shown pressed downwardly from the upper limiting position against the action of the springs 28.

The brake drum 40 of each hub and drum assembly A has the cast annular brake flange 41 and the sheet metal web or back 42, the annular periphery of which is cast into the inturned portion 43 of the brake flange. The drum back 42 has a central opening 43' of approximately the same diameter as the inside of supporting ring 24, and is also formed with a pair of apertures 44, one of which is shown in Figs. 3 and 10. The apertures 44 are spaced from each other angularly with respect to the drum back and on a circle concentric with the brake flange.

The supporting member 20 has a pair of pins 45 which extend within vertical passages 46 in the supporting member 20. The pins 45 are slidable within passages 46, and the passages have enlarged lower portions 47 slidably receiving the heads 48 of the pins. A coil spring 49 is within the enlarged portion 47 of each passage to urge the associated pin upwardly to the position illustrated in Figs. 3 and 10 in which the head 48 of the pin abuts the shoulder separating the enlarged lower portion 47 from the upper portion of the passage 46 and in which the upper end of the pin extends above the supporting member to enter the registering aperture 44 in the drum back. The pins 45 are angularly spaced so as to correspond with the spacing between the apertures 44 and are of approximately the same diameter as the apertures 44 so as to angularly locate the brake drum on the supporting member 20. The springs 49 are compressed between the heads 48 of the pins and the plugs 50 which close the lower ends of the enlarged portions 47 of the passages.

Each drum back is also formed with a circular series of five apertures 55 which are spaced apart equal distances and which are located on the same circle as apertures 44. The apertures 55 are provided to receive the studs which secure the brake drum to the hub 56. The annular flange 57 of the hub is also provided with a circular series of apertures 58 located to register with the respective apertures 55 in the assembled relation of the hub and brake drum, and being of a very slightly smaller diameter than the apertures 55. The tubular portion 58' of the hub extends through the central aperture in the drum back in assembled relation.

The supporting member 20 of each support 4 is provided with a plurality of pins which are arranged in a circle in positions to register with the apertures 55 and 58 in the drum back and hub flange. Five such pins are provided and one of these pins, indicated at 59, is of a somewhat different construction from the others. The other four pins 60 are of identical construction, and one of the pins 60 is shown in Fig. 3. Each pin 60 is cylindrical, has a tapered upper end and is supported for vertical sliding movement within a tubular bushing 61 located in the upper counterbored portion of a passage 62 in the supporting member. Each pin 60 has an enlargement 63 at the lower end which is hollow. A coil spring 64 extends within the recess in the hollow enlargement 63 through the open lower end thereof, being compressed between the closed upper end of the recess and the plug 65 which closes the bottom of passage 62. The spring 64 normally urges the pin 60 upwardly to the position illustrated in which the pin extends into the registering apertures 55 and 58. The pins 60 are primarily stud guides and serve to guide the stud shanks which are inserted into assembled relation with the hub and drum assembly. These pins are of somewhat less diameter than the registering apertures 55 and 58.

One of the assembling studs is indicated at 70 in Figs. 10, 11 and 18. Each stud 70 comprises a head 71 and a threaded shank 72 of approximately the same diameter as the inside diameter of the tubular bushings 61 so that the stud shanks are closely guided by the bushings 61 as they are inserted in apertures 55 and 58. The portion 73 of the shank adjacent the head is enlarged, and has a knurled circular part 74. The enlarged portion 73 is of approximately the same diameter as the apertures 55 and 58, and the knurled portion 74 is of a slightly greater diameter than the apertures 58 so as to have a pressed fit with the apertures 58 when assembled with the hub and drum assembly. The upper end of each tubular bushing 61 is provided with diametrically opposite recesses 75 (Fig. 3) to upset the metal of the enlargement 73 and stake the stud to the underside of the drum back.

The other stud guiding pin 59 is shown in Figs. 10, 11 and 12 and differs from pins 60 in that at its upper end it has a narrow transversely elongated head 81 of a length greater than the diameter of the pin 59. The tubular bushing 82 differs from bushing 61 by being formed with diametrically opposite vertical slots 83 for receiving and guiding the ends of the head 81. The inside diameter of the tubular bushing is approximately the same as the diameter of pin 59 to slidably receive the latter and is also approximately the same in diameter as the shank of the studs to provide a guide for the studs as they are inserted into assembled relation with the hub flange and drum back. The length of the head 81 is slightly less than the diameter of the aperture 55 and approximately the same, although somewhat less than the diameter of the aperture 58 to enable the head to pass through aperture 55 and to fit closely within aperture 58 to angularly locate the hub. The hub is radially located by the supporting ring 24 which receives the tubular portion of the hub.

The pin 59 is like pins 60 in that it is provided with a recessed enlargement 85 at the lower end to receive the spring 86 compressed between the plug 87 closing the lower end of passage 62. The spring normally urges the pin 59 upwardly to a position in which its head extends within aperture 58.

A locking mechanism 90 (Fig. 1) is provided for locking the turntable in an accurately predetermined position after each indexing by the Geneva mechanism 5. The locking mechanism 90 comprises a pin 92 having a tapered head 93 adapted to enter the tapered recess 94 of one of the sockets 95. Six such sockets are provided at 60° intervals around the periphery of the turntable. The pin 92 is slidable in the guide 96 and is reciprocated by a pneumatic piston-cylinder assembly 97. The pin 92 is connected to the piston (not shown) of the piston-cylinder assembly 97. Normally, the piston of the piston-cylinder assembly is spring retracted to withdraw the tapered head of the pin 92 from the recess 94 of a registering socket, thereby permitting the turntable to rotate. A 3-way valve 98 is provided to admit air under pressure through line 99 to the head end of the assembly 97, thereby extending the head of the pin 92 to the position shown in Fig. 1. Air under pressure is received from a suitable source not shown through the pressure line 100.

The exhaust line is shown a 101. The valve is controlled by a solenoid S which, when energized, shifts the valve 98 to a position connecting lines 99 and 100. When the solenoid is de-energized, the line 99 is connected to exhaust 101. The hub and drum assemblies are manually loaded on the adjacent support 4 at the loading station 105. There is also provided a bearing cup assembling station 106, a stud inserting station 107 and an unloading station 108.

At the bearing cup assembling station is provided the bearing cup assembling mechanism 110 shown in Figs. 2 and 3. The bearing cups to be assembled with the hub are indicated at 111 and 112 respectively. The upper bearing cup 111 is in the form of a circular annulus having a frusto-conical inner surface and a cylindrical outer surface. The bearing cup 112 is similarly formed although smaller in size.

The bearing cup assembling mechanism 110 includes a plunger guide block 113 bolted to the rigid frame member 114. The block 113 has a vertical through passage 115 in which is secured a tubular bushing 116 for guiding the upper bearing cup assembling plunger 117. A bearing cup supporting member 118 is secured to the bottom of the block 113 and has a vertical through passage 119 aligned with the vertical plunger 117 and slightly larger in diameter than the plunger. Bearing cups 111 are admitted to the supporting member 118 through the inclined chute 120 which communicates with the passage 121 in the supporting member 118 leading to the vertical passage 119 therein.

Referring to Figs. 3, 4 and 5, the supporting member 118 has the diametrically opposed pairs of bosses 122 which project upwardly from the top of the supporting member and into suitable recesses 123 in the block 113. A bearing cup retaining dog 124 is associated with each pair of bosses, being pivotally supported therebetween on horizontal pins 125 which extend between the bosses of each pair. The dogs 124 are diametrically opposed and have inward projections 125' at the lower ends for supporting a bearing cup in the vertical passage 119. The dogs are resiliently urged toward one another by the spring pressed pins 126. The bearing cups 111 are slightly smaller in diameter than the passage 119.

A micro-switch 127 is secured to the block 113 by a bracket 128. The micro-switch has a plunger 129 which normally extends into the vertical passage 119 beyond the position illustrated in Fig. 3 for engagement with a bearing cup 111 supported in the passage by the dogs 124. When thus engaged by a bearing cup, the pin 129 closes the micro-switch 127.

The vertical plunger 117 is connected to the piston rod 130 of the hydraulic piston-cylinder assembly 131 which is vertically disposed and secured to the rigid frame member 114. The piston-cylinder assembly 131 reciprocates the plunger between the lower position illustrated in Fig. 3 and an upper position in which the lower end thereof is above the lower end of the supporting member 118. A plug 132 is threaded into piston rod 130 and the connecting bolt 133 is threaded into the plug. The bolt extends through an axial passage 134 in the plunger 117 and the bolt head engages the shoulder formed between the passage and the recess 135 at the lower end of the plunger. The upper annular end surface 135' of the plunger is clamped against the piston rod 130. This connection between the piston rod and plunger permits a slight universal wobble of the plunger to properly align itself in operation.

The lower end portion of the plunger is reduced in cross-section and has a semi-annular frusto-conical surface 136 of approximately the same radius, at the upper end thereof, as the inside of bearing cup 111. The frusto-conical portion 136 is connected to the upper generally cylindrical portion of the plunger 117 by a radial shoulder or seat. Diametrically opposite to the frusto-conical portion 136, the plunger 117 has a flat surface 137 upon which is secured a leaf spring 138 having a raised portion 139 adapted to engage under the bearing cup and retain it in position on the plunger. Thus when the plunger moves downwardly from its upper limiting position, it will pick up the bearing cup supported by the dogs 124 and carry it down to the Fig. 3 position. The spring 138 will resiliently retain the bearing cup on the plunger during this movement.

The tubular portion of the hub 56 has an annular internal rib 140 connected to the cylindrical portion 141 thereabove by a radial shoulder. The diameter of the cylindrical portion 141 is substantially the same as the outside diameter of the bearing cup 111 so that the bearing cup will have a pressed fit with the cylindrical portion 141 when in the assembled relation illustrated in Fig. 3.

The lower plunger 150 is vertically reciprocable and aligned with plunger 17. It is shown in its upper limiting position in Fig. 3, and is retractable to its lower limiting position in which the upper extremity thereof assumes the dotted line position indicated at 151 in Fig. 3. The plunger 150 has an enlarged frusto-conical lower end portion 152, the spherically convex bottom surface 153 thereof engaging the spherically concave upper surface of the piston 154. The piston 154 is vertically reciprocable in the vertical guide passage 155, and the lower end portion 152 of the plunger is secured to the piston by a clamp 156. The clamp is annular and has a frusto-conical inner surface engageable with the frusto-conical annular side surface of the portion 152. The clamp 156 is secured to the piston 154 by bolts 160. The clamp somewhat loosely engages the portion 152 of the plunger to enable a limited universal angular movement of the plunger so that the plunger may align itself properly with the upper plunger 117.

The upper end portion of the plunger 150 is reduced to provide the cylindrical pilot 162 having approximately the same diameter as the cylindrical recess 135 in plunger 117 to enable the pilot to enter the recess and slide freely therein. The limited angular movement of the plungers 117 and 150 enables them to align properly and facilitates the movement of pilot 162 into the recess 135. The plunger 150 also has a frusto-conical surface 165 which is separated from the cylindrical main body portion 166 thereof by an annular shoulder 167. The frusto-conical portion 165 is approximately the same diameter as the inside frusto-conical surface of the bearing cup 112 so that the bearing cup may be supported upon the shoulder 167 in the position illustrated in Fig. 3.

The plunger 150 is adapted to press a cup 112 into the cylindrical surface 167' of the hub with a pressed fit against the seat defined by annular rib 168'.

The bearing cups 112 are delivered to the bearing cup assembling apparatus through a chute 168. The chute 168 communicates with passage 169 in the bearing cup supporting member 170, and the passage 169 leads to the vertical passage 171 in member 170. Member 170 is rigidly supported in fixed position beneath the turntable. Passage 171 is aligned with the plunger 150 to freely receive the latter. The diameter of the passage 171 beneath the connecting passage 169 is reduced to a diameter less than the outside diameter of the bearing cups 112 so that the bearing cups cannot drop through the reduced portion of passage 171 in the lower position of plunger 150. Member 170 serves as an anvil during insertion of the bearing cups, although springs 28 raise member 20 clear of member 170 for indexing.

A micro-switch 175 is provided having an actuating plunger 176 extending into the passage 171 above the reduced portion thereof for engagement with the bearing cups. Upon engagement of the plunger by a bearing cup, the limit switch 175 is closed.

The piston 154, which reciprocates the plunger 150, is connected to a rod 180 which in turn is connected to the piston of the vertically disposed hydraulic piston-cylinder assembly 181.

The bearing cups 111 are adapted to be contained in a hopper 190 (Fig. 7). The hopper has an inclined bottom wall 191 which slopes downwardly toward the front wall 192. The front wall 192 is provided with a vertical slot 193 which is of a width less than the axial length of the bearing cups 111 so that the bearing cups cannot escape through the slot. The bearing cups are individually removed from the hopper by the mechanism indicated at 194. Mechanism 194 comprises a pair of sprockets 195 and 196 around which extends a link chain 197. A shaft 198 rigidly mounts sprocket 195 and a pulley 199, and a belt 200 extends over pulley 199 and another pulley 201. The pulley 201 is driven by a suitable source of power not shown to move chain 197 in the direction of arrow 201'. The chain 197 is provided along its length with a plurality of spaced members 202 having outwardly projecting fingers 203 of a width sufficiently small to enter the slot 193. The sprockets 195 and 196 are arranged to provide a vertical length of chain 204 between the sprockets disposed adjacent to the front of the hopper so that the fingers 203 will project into the hopper through slot 193. The bottom wall 191 and top wall 205 of the hopper are slotted at 206 and 207 respectively to clear the fingers. The bottom slot is narrower than the axial length of the bearing cups 111 and shorter than the diameter thereof.

The front wall 192 has a rearwardly and upwardly inclined section 208. A vertical guide plate 209 is provided to back up the portion 204 of chain and particularly the members 202 to maintain them in the upright position illustrated in which the top surfaces of the fingers are inclined upwardly and rearwardly. The members 202 press hard against plate 209 and are thus prevented from turning. As a result, a bearing cup picked up by one of the fingers will be cammed to the free end of the finger by the inclined front wall section 208. A bearing cup which is picked up by a finger must be oriented with its frusto-conical inner surface tapering radially inwardly in a forward direction in order to be carried from the hopper by the finger. Bearing cups which are not so oriented, as for example the bearing cup 210, will drop off the finger and fall back into the hopper. As a result, the bearing cups delivered to the upper bearing cup inserting mechanism are properly oriented.

The chute 120 shown in Fig. 3 is connected to and is a continuation of the chute 211 in Fig. 7. The chute 211 is formed by the tube 212 above the separating partition 213. The separating partition 213 extends from one side to the other of the tube and has a central slot 214 extending in continuation of the slot 193 in the front wall of the hopper. Thus the bearing cups are carried from the hopper into the arcuate section 215 of the tube 212 by the fingers, slot 214 clearing the fingers, and the bearing cups thereafter slide by gravity down the inclined section 216 of the tube through chute 211 and into the upper bearing cup assembling mechanism. The tube 212 has a longitudinal slot 217 in the under side for clearing the fingers. The chute portion 211 of the tube 212 closely receives the bearing cups so they cannot turn over as they slide along.

The chute 168 may be serviced by a similar hopper and delivery mechanism. However the chute 168 should have a twisted section to invert the bearing cups so that they will be properly oriented for insertion into the lower end of the tubular portion of the hub.

Hydraulic fluid is supplied to opposite ends of the piston-cylinder assembly 131 by fluid lines 217 and 218 through the 4-way valve 219. Hydraulic fluid under pressure is supplied from a suitable source through line 220, and 221 is an exhaust line. Hydraulic fluid is supplied to opposite ends of piston-cylinder assembly 181 by lines 222 and 223 through 4-way valve 224. Hydraulic fluid under pressure is supplied from a suitable source through line 224', and 225' is an exhaust line.

Referring to Figs. 2 and 8–18, the stud inserting mechanism at station 107 is generally indicated at 225. The stud inserting mechanism includes a plurality of stud inserting devices 226. Five stud inserting devices are provided respectively located directly above the five tubular sleeves 61 and 82 of a hub and drum assembly support of the turntable in any indexed position of the turntable and also directly above the respective pairs of aligned apertures 55 and 58 in the hub and drum assemblies when supported on the turntable as indicated in Fig. 10. A guide block 227 is rigidly secured to the frame member 228. The guide block is formed with five vertically disposed cylindrical through passages 229 lined with sleeves 230. The passages 229 and hence the sleeves 230 are respectively axially aligned with the five sleeves 61 and 82 of the support directly therebeneath in any indexed position of the turntable. Each stud inserting device 226 includes a tubular holder 231, and the holders 231 are respectively received in the sleeves 230 for vertical reciprocation therein. The holders 231 have collars 232 at their upper ends for limiting the downward movement of the holders.

The internal diameter of each stud holder is reduced at the lower end as indicated at 233, to approximately the diameter of the stud heads or slightly larger, to receive the studs. Also, each stud holder has a lateral port 234 for admitting a stud. The studs are admitted to the stud holder by the stud chutes 235 respectively associated with the five stud inserting devices 226. These chutes are downwardly inclined toward their discharge ends and are secured to the tubular brackets 236 secured to the guide block 227. The studs in the stud chutes may pass by gravity from the discharge end of the chutes 235 into the inclined tubular brackets 236 and from there into the respective stud holders through the inclined passages 237 in the guide block and the opening 238 in the associated sleeve 230. The studs are adapted to travel downwardly in the chutes shank end first so as to enter the reduced lower end portions of the stud holders with the shank down.

Each stud holder has at its lower end a pair of stud holding dogs 240 (Figs. 15 and 16) respectively supported on horizontal pivots 241 in diametrically opposed slots 242. Springs 243 normally urge the dogs about their pivots in a direction to move the lower ends of the dogs toward each other to a position in which the inner surfaces 244 of the dogs engage the radially inner surfaces of the slots 242 at which time the shoulders 245 on the lower ends of the dogs project beneath the reduced portion 233 within the stud holder. A stud admitted to one of the stud holders will immediately drop through the reduced tubular portion 233 and become suspended with its head engaged and supported by the shoulders 245 of the dogs 240 (Fig. 18).

Each stud inserting device also includes a plunger 250 which is vertically reciprocable within the associated stud holder 231. Each plunger is closely received in the associated stud holder and has a reduced cylindrical portion 251 at the lower end adapted to be slidably received in the reduced tubular portion 233 at the lower end of the associated holder. Each plunger 250 is connected to the rod 252 of a piston 253 reciprocable within a bore 254 in the hydraulic piston-cylinder assembly 255 vertically disposed above the guide block 227 and rigidly secured to the frame member 256. A coupling 257 is provided for connecting each plunger to one of the connecting rods 252. Each of the pistons 253 is reciprocable within a bore 254 in the cylinder 259 of the assembly 255, and the upper ends of the bores 254 communicate with each other and with the hydraulic fluid port 260. The lower ends of the bores communicate with each other and with the fluid port 261. Hydraulic fluid is delivered to and exhausted from ports 260 and 261 by lines 262 and 263 through 4-way valve 264. Hydraulic fluid under pressure is supplied to line 265 from a suitable source, and 266 is an exhaust line, Each plunger 250 has a transverse elongated slot 267 which slidably receives a pin 268 secured to and extending across the upper end of the associated stud holder. A coil spring 269 surrounds each plunger 250 and is adapted to be compressed between the collar 232 of the associated stud holder and the coupling 257.

The pistons 253 are capable of reciprocating the plungers 250 from an upper position illustrated in Fig. 13 to a lower position illustrated in Fig. 10. In the upper position of Fig. 13, the stud holder 231 is held up in a position with its lateral port 234 aligned with the opening 238 in the liner by reason of the pin 268 being suspended in the bottom of the slot 267. The stud holder is also held in the Fig. 13 position after initial downward movement of the plunger. This is accomplished by the threaded detent 270 threadedly engaged in the passage 271 in the guide block 227. A detent 270 (Fig. 9) is provided for each stud holder and each has a spring pressed tip 272 engageable with the lower end of the stud holder to hold it up. When the plunger reaches the Fig. 14 position and begins to compress the spring 269, the tip 272 will be cammed inwardly to clear the stud holder and the stud holder and plunger then move as a unit to the Fig. 10 position whereupon the collar 232 of the stud holder engages the guide block. Continued movement of the plunger will eject the stud from the dogs 240, spreading the latter apart and the stud is then pressed into assembled relation with the hub flange and drum back through the registering openings 55 and 58. The enlarged intermediate portion 70 of the stud is staked by the sleeves 61 and 82 to secure the parts of the hub and drum assembly together.

Since each piston 253 of the assembly 255 is exposed to the hydraulic fluid under pressure entering port 260, the pistons are independent of one another and each plunger is assured of bringing to bear sufficient pressure to insert the stud.

Each stud holder has an elongated axially extending slot 280 in its side, and a pin 281 threaded into the guide block 227 extends into the slot 280 to guide the vertical reciprocation of the stud holder. The block 282 is located below a work support on the turntable in an indexed position thereof and is normally spaced beneath the supporting member 20 thereof. The block 282 serves as an anvil to back up the supporting member 20 when the stud inserting mechanism is operated.

The studs are delivered to the chutes 235 by the stud separating mechanism 300 (Figs. 19–22). The stud separating mechanism receives studs from any suitable source of supply from a single chute 301. The chute 301 has an elongated central T-shaped passage 302, the upper transverse portion 303 of the passage being adapted to support the head of a stud and the depending portion 304 being sufficiently wide to clear the stud shank. The chute 301 is inclined downwardly so that the studs may move there-along by gravity. Cover plates 305 are provided at the top of the chute to retain the studs.

The separating mechanism comprises a supporting block 306 having a transverse channel 307 which serves as a guide for the stud separator slide 308. The separator slide is of inverted T-shape and the lower broadened end thereof is slidably engaged in the channel 307. The upper narrower portion of the slide is formed with five laterally spaced stud slots 310. Each stud slot is of T-shaped cross section and adapted to support the head of a stud on the upper transverse portion thereof. The depending portion of the slot clears the stud shanks. The tops of the slots are open but covered by a plate 311.

The chute 301 terminates at the rear side of the stud guide in a discharge end which extends into the support 306 through a slot 315 therein. A stud gate 316 is supported on a bracket 317 carried by the support. The stud gate is generally U-shaped and has a lower arm 318 adapted to extend across the stud chute 301 in one position and to clear the latter in the illustrated position.

The leg 318 is slidably supported in a slot 320 in the end of stud chute 301, and the other leg 321 thereof has a slot 322 which is elongated transversely of the chute and receives a pin 323 secured to the bracket 317. The stud gate is thus supported for transverse sliding movement between the bracket 317 and the stud separator 308.

Leading from the front side of the separator mechanism are five laterally spaced stud chutes 330. Each stud chute 330 is generally T-shaped in cross-section and has an upper transverse portion for supporting the stud heads and a lower relatively narrow portion for clearing the stud shanks. The spacing between the chutes 330 is substantially the same as the spacing between the stud slots 310 in the separator slide. The stud chutes 330 are partially covered on top by the plates 332, and these stud chutes extend downwardly to allow studs to travel along by gravity. The lower discharge ends of the chutes 330 communicate respectively with the downwardly inclined chutes 235 which deliver studs to the stud inserting devices 226. The studs leave chutes 330 and drop shank end first into chutes 235 (Fig. 19).

A second stud gate 340 is provided which is angle shaped. One leg 341 thereof carries the pivot blocks 342 which are pivoted to the transverse pin 343 to enable vertical swinging of the stud gate 340. Pin 343 is carried by block 344 mounted on support 306. The depending leg 345 of the stud gate is adapted to extend between the separator slide and the stud chutes 330 to prevent the passage of studs from the slide to the chutes in the normal position of the gate shown in Fig. 19 which it assumes by gravity.

The separator slide carries a bracket 350 on which is supported a pin 351 engageable with the stud gate 316 to shift the latter to the left as viewed in Figs. 20 and 22 at the end of a corresponding movement of the stud separator so that the leg 318 thereof covers the discharge end of chute 301. The stud separator also carries a cam 352 engageable with a pin 353 on the depending leg of the stud gate 340 to raise the latter to a position permitting communication between the separator slide and the chutes 330 at the end of movement of the separator slide to the left.

The separator slide has a member 355 engageable with the adjacent end of the stud gate 316 at the end of movement of the separator slide to the right to return the leg 318 of the stud gate to the illustrated position uncovering the chute 301.

The separator slide 308 is reciprocated by a pneumatic piston-cylinder assembly 360. The assembly 360 includes a cylinder 361 having a piston (not shown) therein to which is connected a piston rod 362 extending beyond one end of the cylinder. A bar 363 is rigidly connected to the piston rod and to the separator slide for movement of the slide as a unit with the piston of the assembly 360. The assembly 360 is adapted to reciprocate the slide 308 from the retracted or inner position illustrated in solid lines in Figure 22 in which the outermost slot therein is substantially aligned with the T-shaped passage 302 in the chute 301 to an extended or outer position shown in dotted lines in which the slots 310 in the separator slide respectively register with the stud chutes 330. A bolt 363' carried by bar 363 engages abutment 364' to determine the inner limiting position of the separator slide. As the stud slide 308 moves from its inner to its outer position, the slots 310 therein successively pick up a stud from the delivery passage 301 and towards the end of the outward movement of the separator slide, the pin 351 thereon engages the stud gate 316 shifting the latter in an outward direction until the leg 318 thereof extends across the stud chute 301 to prevent any more studs from leaving the chute. Slightly before the stud slide reaches the end of its outward movement, the cam 352 engages pin 353 on the stud gate 340 to lift the latter and permit the studs in the slots of the separator slide to drop into the stud chutes 330 when the slots 310 respectively register with the stud chutes. Upon retraction of the separator slide, the cam 352 moves out of engagement with the pin 353 to permit the stud gate 340 to return by gravity to the illustrated position covering the stud chutes 330. Towards the end of the retraction movement of the separator slide, the member 355 engages the leg 321 of the stud gate 316 and shifts the latter inwardly to a position in which the leg 318 uncovers the stud passage 301.

Unloading mechanism 400 is provided at the unloading station 108. The unloading mechanism comprises a supporting frame 401 having adjacent the upper end the laterally spaced rails 402 which extend in a generally radially inward and outward direction relative to the turntable 2. The unloading mechanism also includes a carriage 403 having a front axle 404 and a rear axle 405 each of which has a pair of flanged wheels 406 respectively engaging the rails 402. The carriage axles are connected together by the side links 407 and 408. (See Figs. 23–28.)

The carriage supports lifting device 409 including a pair of laterally spaced drum supporting arms 410 which are pivoted to the front axle and extend forwardly therefrom in parallel relation. The arms 410 are connected together by the generally C-shaped bar 411. The arms are also connected by the transverse bar 412, so that the arms of the lifting device swing as a unit about the horizontal axis of the front axle.

One of the arms 410 has secured to it a detent ring 413 which is rotatably mounted on the front axle. The detent ring has two notches 414 and 415 angularly spaced from one another in the periphery thereof. A plunger 416 is longitudinally reciprocable in the housing 417 (Fig. 25) secured to the link 407. The housing 417 is cup shaped and has a cylindrical liner 418 which slidably receives the plunger. The plunger has a hollow rear end into which extends a compressor coil spring 419 which bears against the bottom of the hollow recess in the plunger and against the bottom of the housing to urge the plunger in a forward direction. The plunger is aligned with the detent ring and has a reduced end 420 adapted to enter either of the notches 414 or 415 that happen to be aligned with it.

Normally the arms 410 are in the generally horizontal position illustrated in solid lines in Fig. 25 in which the notch 414 is aligned with and receives the reduced end 420 of the plunger 416 to lock the arms 410 in the generally horizontal position. The arms 410 are swingable in an upward direction to the dotted line position of Fig. 25 in which the notch 415 registers with the reduced end 420 of the plunger to lock the arms in the upper position.

The arms are spaced apart a distance slightly greater than the diameter of the annular flange of the brake drum but less than the diameter of the collar 422 at the upper end of the brake drum. The carriage is movable in a forward direction to extend the arms beneath the collar 422 on opposite sides of the brake drum and the arms are then elevated to the dotted line position to lift the brake drum and hub assembly from the adjacent turntable support, inverting it and depositing it upon the supporting plate 423. The supporting plate 423 extends from the front end to the rear end of the supporting structure 401 and is secured to the supporting structure 401. The intermediate horizontal portion of the supporting plate extends between the parallel ends of the C-shaped bar 411 and also between the intermediate horizontal portion of the bar 411 and the axles of the carriage. The rear end 424 of the plate 423 slopes downwardly for discharge of a hub and drum assembly.

The carriage is movable from a rear limiting position shown in dotted lines in Fig. 25 to a forward limiting position shown in solid lines in this figure. Rearward movement is limited by the stops 425 on the rails which engage the wheels of the carriage, and forward movement is likewise limited by stops 426 on the rails engageable with the carriage wheels.

The carriage is moved forwardly and rearwardly by the hydraulic piston-cylinder assembly 430. The assembly 430 includes a cylinder 431 pivoted at its lower end for swinging movement in a vertical plane by the pin 432 rigidly carried by the bracket 433. The assembly 430 also includes a piston (not shown) reciprocable within the cylinder, and a piston rod 434 is connected to the piston and extends through the upper end of the cylinder. The rod 434 has a yoke 435 at the upper end and a pin 436 extends across the legs of the yoke and pivotally supports one corner of the triangularly shaped rocker 437. A second corner of the rocker 437 is pivoted to a frame member 438 rigid with the supporting frame 401 by a pivot pin 439. The third corner of the triangularly shaped rocker is pivoted to a pair of links 445, and the other ends of the links 445 are pivoted to a connecting member 446 by a pin 447, the connecting member being welded to the transverse bar 412.

The carriage also includes a plunger retracting lever 450 which is pivoted to the link 407 by a pin 451. The pin 451 is supported in a mounting block 452 welded to link 407. The lever 450 has a central opening 455 which loosely receives the reduced end 420 of the plunger. The lever 450 is engaged by the lever release pin 460 in the rearward position of the carriage to rotate the lever in a clockwise direction and retract the reduced end of the plunger out of the notch in the detent ring of the drum supporting device 409. In the forward limiting position of the carriage the lever engages the release pin 461 which likewise rotates the lever in a clockwise direction to retract the reduced end of the plunger from the registering notch in the detent ring.

In the retracted or rearward position of the carriage, the plunger 416 is held withdrawn and the supporting arms 410 are substantially horizontal. When the carriage is initially advanced by the piston-cylinder assembly 430, the plunger is released and permitted to enter the registering notch 414 in the detent ring to lock the arms 410 in horizontal position. As the carriage approaches its forward limit, the arms 410 extend under the collar 422 of the brake drum on the adjacent support of the turntable and on opposite sides of the brake drum and continued advance of the carriage results in withdrawal of the reduced end of the plunger 416 from the notch 414 by the lever 450 which is rotated clockwise upon engagement with the forward lever release pin 461. This position of the carriage and associated parts is indicated at 470 in Fig. 24. Continued forward movement of the carriage is then prevented by the stops 426. However the rocker 437 continues to rock counterclockwise by the force of the piston-cylinder assembly 430 to the dotted line position indicated at 471 with the result that the rocker arm, through the link 445 and the connecting member 446, rotates the drum supporting arms 410 to the dotted line position of Fig. 25. The arms 410 are elevated through an angle greater than 90° and are inclined upwardly and rearwardly to invert and deposit the hub and drum assembly on the supporting plate 423.

Upon initial rocking movement of the rocker 437 in a clockwise direction by the piston-cylinder assembly 430, the carriage is moved rearwardly to release the plunger 416 which thereupon enters the registering notch 415 in the detent ring to lock the supporting arms in the elevated position during the subsequent rearward movement of the carriage. The carriage is initially moved rearwardly rather than first swinging the device 409 back to horizontal position, because of the overcenter position of device 409 and the minimum of friction opposing movement of the carriage. Just prior to engagement of the carriage wheels with the rear stops 425, the lever 450 is engaged by the release pin 460 to retract the plunger 416 whereupon continued clockwise rotation of the rocker 437 will return the supporting arms 410 to the horizontal position. The C-shaped bar 411 of the lifting device 409 engages the hub and drum assembly deposited on the plate 423 and pushes it rearwardly during rearward movement of the carriage. When the assembly is pushed to the inclined section 424 of the plate, it slides by gravity to suitable mechanism such as a conveyor for removal. Hydraulic fluid is delivered to and exhausted from the ends of cylinder 431 by lines 480 and 481 through 4-way valve 482. Lines 483 and 484 are respectively connected to hydraulic fluid under pressure and exhaust.

There is provided at the unloading station a kicker mechanism 490 (Fig. 29) for loosening the assembled hub and drum assembly from its support on the turntable. During the inserting of the bearing cups and the studs, the hub and drum assembly is likely to become stuck on the support. In particular, the tubular portion of the hub is likely to become wedged tightly in the supporting ring 24 and the studs are likely to have a tight engagement with the staking recesses in the stud guiding sleeves 61 and 82. The kicker mechanism is located at the unloading station and comprises a hydraulic piston-cylinder assembly 491 including a cylinder 492 rigidly mounted on a frame member 493 and having a piston (not shown) reciprocable therein. A rod 494 is connected to the piston (not shown) of the assembly and extends beyond the cylinder and is connected to a plunger 495. The plunger 495 is guided in a vertically disposed sleeve 496 carried by the guide sleeve support 497. The guide sleeve 496 and hence the plunger 495 are accurately aligned with the vertical passage 23 in the supporting member 20 of the registering hub and drum assembly support, and also with the supporting ring 24. The plunger is reciprocated by the assembly 491 from a lower position indicated by the dotted line 499 to an upper position shown in solid lines. In the lower position, the plunger 499 clears the turntable 2 to permit indexing, and in the upper position the plunger is engageable with the tubular portion of the hub to free it from the supporting member 20. The kicker mechanism is actuated, as will appear below, prior to the unloading of the hub and drum assembly by the mechanism 400.

Hydraulic fluid is supplied to and exhausted from opposite ends of the cylinder 492 by lines 501 and 502 through 4-way valve 503. Lines 504 and 505 are respectively connected to a source of hydraulic fluid under pressure and to exhaust.

The operation of the machine will be described along with a description of the wiring and control mechanism. The motor 13 is continuously operated to rotate the radial arm 10 of the driving wheel counterclockwise (Fig. 30). The roller 11 on the outer end of the radial arm is engageable in the radial slots 8 of the driven wheel 6 to index the driven wheel, and hence the turntable directly connected thereto, through increments of 60° in a clockwise direction (Fig. 1). When the roller 11 leaves a radial slot, the hub 12 fits the periphery of the adjacent spoke portion of the driven wheel to lock it against angular movement between intermittent increments of rotation. Since the work supports 4 of the turntable are located at 60° intervals, each work support moves to the position occupied by the one ahead with each indexing of the turntable.

When the radial arm 10 of the Geneva mechanism 5 leaves the radial slot in the driven wheel 6, the roller 11 thereon passes and momentarily closes the normally open limit switch LS. Cosing of limit switch LS energizes relay A (Fig. 31) to close contact A-1 of the relay and seal in the relay after the limit switch opens. The relay has a second contact A-2 which closes upon energization of the relay to energize the solenoid S. Energization of solenoid S (Figs. 1 and 31) shifts the 3-way valve 98 from its normal position in which line 99 is connected to the exhaust line 101 to a position in which the line 99 is connected to the air pressure line 100, thereby introducing air under pressure to the head end of the pneumatic cylinder 97 and advancing the locking pin 92 into engagement with the recess 94 of a registering socket in the turntable to lock the turntable accurately in indexed position.

As the locking pin 92 moves radially inwardly, the flexible finger 510 engages limit switch LS-2 to momentarily close the latter. Upon retraction or radially outward movement of the locking pin, the finger 510 merely flexes past the operating arm of the limit switch and does not operate it. The strut 511 prevents flexing of the finger upon radially inward movement of the locking pin.

An operator standing at the loading station 105 will place a hub and drum assembly A upon the adjacent work support 4 after indexing, with pins 45 engaging in holes 44 of the drum back and pins 59 and 60 engaging in registering holes 55 and 58 in the drum back and hub flange.

Another work support 4 is in registration with the bearing cup assembling station 106 in the indexed position of the turntable. The limit switch LS-2 operated by the locking pin 92 has a contact LS-2A (Fig. 31) which momentarily closes with the momentary closing of limit switch LS-2, thereby energizing relay B. Relay B has a normally open contact B-1 which closes upon energization of the relay to seal it in. Relay B also has a contact B-2 which closes upon energization of relay B to energize solenoid S-2 (Figs. 2 and 31). When solenoid S-2 is energized, it shifts the 4-way valve 219 from its normal position to a position in which hydraulic fluid from line 220 is directed to the upper end of the hydraulic cylinder 131 through line 218 and the lower end is exhausted. The plunger 117 (Fig. 3) is thereby moved downwardly from its normal retracted position above the bearing cup supporting member 118 to pick up a bearing cup 111 held by dogs 124 and press it into the tubular portion of the hub in the position illustrated in Fig. 3 in which the bearing cup seats on the rib 140 and has a pressed fit with the cylindrical inner surface 141. When a predetermined pressure is reached in the line 218, sufficient to press cup 111 securely on its seat in the hub, the pressure switch PS-1 is momentarily closed thereby energizing the relay X to close its contact X-1 and seal in the circuit to the relay. The relay X also has a contact X-2 which is closed upon energization of the relay to energize solenoid S-3.

The energization of solenoid S-3 shifts the 4-way valve 224 from its normal position to a position in which hydraulic fluid from the pressure line 224' is directed to the lower end of the assembly 181 through line 222 and the upper end is exhausted to raise the plunger 150 from its retracted position shown at 151 in Fig. 3 to pick up a bearing cup 112 and press it into assembled relation on the lower seat of the hub. The pilot 162 enters the recess 135 in the upper plunger and both plungers are capable of a limited wobble movement to align the plungers. The normally closed pressure switch PS-2 in line 222 momentarily opens when a predetermined pressure is reached to de-energize relay X and also solenoid S-3 so that the 4-way valve 224 may return to its normal position in which it directs hydraulic fluid under pressure to the upper end of assembly 181 and exhausts the lower end permitting retraction of the lower plunger 150. The pressure switch PS-2 has a lower setting than the pressure switch PS-1 so that the upper plunger 117 will press down upon the hub through bearing cup 111 with a substantially greater pressure than the pressure of the lower plunger 150 upwardly against the hub through bearing cup 111. Therefore the hub and drum assembly A will remain securely located on its support. By the time the predetermined pressure setting of switch PS-2 is reached, sufficient pressure has been applied against both bearing cups to firmly seat them upon their seats in the hub.

During the final stages of retraction of the lower plunger 150, the projection 520 on piston rod 180 engages, moves past and momentarily opens the normally closed limit switch LS–3 to de-energize relay B and solenoid S–2. As a result, the 4-way valve 219 returns to its normal position admitting fluid under pressure to the lower end of the assembly 131 and exhausting the upper end to retract the plunger 117. The projection 520 is spring urged outwardly and merely flexes past the limit switch LS–3 upon upward movement.

In the indexed position of the turntable, another support 4 is positioned in registration with the stud inserting mechanism at station 107. The limit switch LS–2, operated by the locking pin 92, has a second contact LS–2B which momentarily closes when limit switch LS–2 is momentarily closed to energize relay C closing contacts C–1 and C–2 of the relay. Contact C–1 seals in the relay and contact C–2 energizes solenoid S–4 (Fig. 13). As a result, the 4-way valve 264 is shifted from its normal position to a position directing hydraulic fluid under pressure from line 265 to the upper end of assembly 255 and exhausting the lower end of the assembly. As a result, the plungers 250 of the stud inserting devices 225 are moved downwardly to an intermediate position shown in Fig. 14 and thereafter the stud holder 231 moves downwardly as a unit with the plunger through the action of the spring 269. Each stud holder continues to advance until its collar 232 engages the guide block 227. The stud 70 supported by the dogs 240 (Fig. 18) is thereafter ejected by the continued advance of plunger 250 and forced under pressure into the registering openings 55 and 58 in the drum back and hub flange. Sufficient pressure is brought to bear on the studs to cause the knurled portions thereof to have a pressed fit with the openings 58 in the hub flange and to stake the studs to the underside of the drum back. A pressure switch PS–3 in line 262 momentarily opens when a predetermined pressure is reached to de-energize the relay C and hence solenoid S–4 permitting the 4-way valve 264 to assume its normal position in which it directs hydraulic fluid under pressure to the lower end of the assembly 255 and exhausts the upper end to retract the stud inserting devices 225 to the upper limiting position of Fig. 13.

At the end of the downward movement of the stud holders 231, the projections 525 on the collars thereof engage one of the associated limit switches LS–10A–E to hold the latter closed until the stud holders are retracted in an upward direction to release them. When all of the limit switches LS–10A–E are closed, the relay Z is energized to close its contacts Z–1 and Z–2. Contact Z–1 seals in the circuit to the relay to keep it closed after the stud holders are retracted opening switches LS–10A–E and contact Z–2 energizes the solenoid S–6 to shift the 4-way valve 530 of the stud separator from its normal position to a position in which air is admitted under pressure from line 531 to the head end of cylinder 360 through line 532, and the rod end of the cylinder is exhausted through lines 533 and 534. As a result, the stud separator slide (Figs. 19–22), is shifted to the left as viewed in Fig. 22 to pick up studs from the chute 301 in each of its slots 310 and thereafter align such slots with the five stud chutes 330. The movement of slide is slow compared with the retraction of holders 231 so that switches LS–10A–E are opened before limit switch LS–15 (Fig. 22) is opened. Toward the end of the movement of the separator slide, the gate 340 is lifted to discharge one stud into each of the chutes 330 which connect into the chutes 235 to the respective stud inserting devices. The studs pass through the inclined chutes 235 shank end first and are admitted to the stud holder when the stud holder is subsequently retracted to its upper position of Fig. 13. A normally closed limit switch LS–15 is opened by the connecting plate 363 of the stud separator to de-energize relay Z and solenoid S–6 permitting the 4-way valve 530 to return to its normal position in which air under pressure is directed to the rod end of the assembly through line 533 and is exhausted from the head end to return the separator slide to the illustrated position.

Another support 4 registers with the knockout or kicker mechanism 490 (Fig. 2) at the unloading station 108. The limit switch LS–2 has another contact LS–2C which is momentarily closed upon momentary closing of limit switch LS–2 to energize relay Y, closing its contacts Y–1 and Y–2. Contact Y–1 seals in the circuit to the relay and contact Y–2 energizes solenoid S–8 to shift the 4-way valve 503 from its normal position to a position in which it directs hydraulic fluid under pressure to the bottom of the assembly 490 and exhausts the upper end to raise the plunger from its lower position to the upper position shown in dotted lines in which it engages the hub of the assembly A to jar it loose from its support. The pressure switch PS–5 in line 502 is set to open in response to a predetermined pressure to de-energize relay Y and solenoid S–8 thereby permitting the 4-way valve 503 to return to its normal position directing hydraulic fluid under pressure to the upper end of assembly 490 and exhausting the lower end.

During the retraction of the kicker mechanism, a projection 530 on the rod 494 engages and passes the limit switch LS–18 thereby momentarily closing the latter. The projection 530 is spring pressed outwardly and shaped so that it will simply flex past limit switch LS–18 during advance or upward movement of the kicker mechanism. When the limit switch LS–18 is momentarily closed, the relay D is energized closing its contacts D–1 and D–2. The contact D–1 seals in the circuit to the relay and the contact D–2 energizes the solenoid S–5 to shift the 4-way valve 482 from its normal position to a position directing hydraulic fluid to the lower end of the assembly 430 and exhausting the upper end. As a result, the carriage 403 is advanced from the right-hand position of Fig. 24 to the lefthand position thereof with the arms 410 of the lifting device 409 horizontal and adapted to straddle the drum of a hub and drum assembly A on the adjacent support 4 of the turntable. At the forward or lefthand position of the carriage, the arms 410 of the lifting device are elevated to the dotted line position of Fig. 25 through an angle greater than 90° to invert and deposit the hub and drum assembly on the supporting plate 423. When a predetermined pressure is reached in the line 481, the pressure switch PS–4 momentarily opens to de-energize relay D and solenoid S–5 permitting the 4-way valve 482 to return to its normal position directing hydraulic fluid to the upper end of the assembly 430 and exhausting the lower end. As a result, the carriage is retracted to its righthand position with the arms 410 in the elevated position in which the bar 411 connecting the arms engages the drum of the deposited assembly A and moves it rearwardly along the supporting plate 423. When the assembly reaches the inclined portion 424 of the plate, it slides by gravity to a conveyor (not shown) for removing the assembly from the machine. Continued retraction of the carriage results in the return of the lifting device 409 to the horizontal position.

Referring to Figs. 30 and 32, it will be noted that the motor circuit has a normally closed limit switch LS–8 which is adapted to be opened by the roller 11 of the driving wheel of the Geneva mechanism slightly before the next indexing of the turntable. When the limit switch LS–8 is opened by the Geneva mechanism, the limit switches LS–9, LS–11, LS–12 and LS–20A–E must all be closed to maintain the operation of the motor. Limit switch LS–9 is held closed by the assembly 430 of the unloading mechanism in its fully retracted position, limit switch LS–11 is held closed by the lug 540 on the rod 130 of the bearing cup inserting mechanism in its fully retracted position, limit switch LS–12 is held closed by the lug 541 on the rod 494 of the kicker mechanism in its fully retracted position, and limit switches LS–20A–E are held closed by the couplings 257 of stud inserting devices 225 in their fully retracted positions. Hence, unless all of the mechanisms are fully retracted and in position for a new cycle, the motor 13 is stopped halting the indexing operation. Normally open switches 127 and 175 must also be closed when limit switch LS-8 is opened to maintain the circuit to the motor. These switches are closed when engaged by a bearing cup pressed against the plunger of the switch by the weight of succeeding cups in the chute.

A limit switch LS-30 is located adjacent the turntable in position to engage the drum of a hub and drum assembly A on the support 4 one position past the unloading mechanism. This limit switch is normally closed but, if by accident the hub and drum assembly is not unloaded by the unloading mechanism, it will engage and open limit switch LS-30 upon the next indexing of the machine to open the circuit to the motor and halt operation. The turntable will of course stop before the limit switch is disengaged.

Another limit switch LS-31 is provided which is engageable by a flexible finger 550 on each support 4 when in the unflexed or dotted line position of Fig. 3. When a hub and drum assembly A is supported on the support, the drum engages the finger 550 and holds it down in a position where it will clear the limit switch LS-31. Hence, if an operator neglects to load a hub and drum assembly at the station 105, the limit switch LS-31 will be opened during the indexing of the turntable to stop the machine.

Just prior to the movement of the roller 11 of the Geneva mechanism into a slot 8 for indexing, the roller 11 engages the normally closed limit switch LS-22 to open the circuit to relay A and hence deenergize solenoid S. As a result, the 3-way valve 98 for the locking pin 92 is permitted to return to its normal position exhausting the pneumatic cylinder assembly 97 whereby the piston therein is spring retracted to withdraw the locking pin 92 from the registering socket in the turntable to permit indexing and another cycle.

What I claim as my invention is:

1. A machine for securing together wheel hub and brake drum assemblies and for assembling bearing cups with the hubs of the assemblies, comprising a rotatable turntable, supports on said turntable arranged in equal angularly spaced relation about the axis of rotation of said turntable adapted to firmly support hub and drum assemblies with the hub and drum of each assembly predeterminedly related to each other, angularly spaced first, second and third stations adacent said turntable, bearing cup assembling mechanism for assembling a pair of bearing cups with the hub of a hub and drum assembly at said first station, stud inserting mechanism for securing together the hub and drum of an assembly at said second station by inserting studs thereinto, mechanism for loosening a hub and drum assembly relative to its support at said third station, intermittently operated means for rotating said turntable angular increments corresponding to the angular spacing between said supports to move said supports past said first, second and third stations in succession and momentarily stopping with a support at each station, means for operating said mechanisms at approximately the same time between each interval of rotation of said turntable, and unloading mechanism responsive to the operation of said loosening mechanism for removing from its support a hub and drum assembly at said third station.

2. A machine for securing together wheel hub and brake drum assemblies and for assembling bearing cups with the hubs of the assemblies, comprising a rotatable turntable, supports on said turntable arranged in equal angularly spaced relation about the axis of rotation of said turntable adapted to firmly support hub and drum assemblies with the hub and drum predeterminedly related to each other, angularly spaced first, second and third stations adacent said turntable, bearing cup assembling mechanism for assembling a pair of bearing cups with the hub of a hub and drum assembly at said first station, stud inserting mechanism for securing together the hub and drum of an assembly at said second station by inserting studs thereinto, unloading mechanism for removing from its support a hub and drum assembly at said third station, intermittently operated means for rotating said turntable angular increments corresponding to the angular spacing between said supports to move said supports past said first, second and third stations in succession and momentarily stopping with a support at each station, means for operating said mechanisms at approximately the same time between each intermittent interval of rotation of said turntable, a loading station adjacent said turntable in advance of said first station for loading a hub and drum assembly on a support, and means between said loading station and said first station responsive to the absence of a hub and drum assembly on the support moving between the latter stations for rendering inoperative said mechanisms and said intermittently operated means.

3. A machine for securing together wheel hub and brake drum assemblies and for assembling bearing cups with the hubs of the assemblies, comprising a rotatable turntable, supports on said turntable arranged in equal angularly spaced relation about the axis of rotation of said turntable adapted to firmly support hub and drum assemblies with the hub and drum predeterminedly related to each other, angularly spaced first, second and third stations adjacent said turntable, bearing cup assembling mechanism for assembling a pair of bearing cups with the hub of a hub and drum assembly at said first station, stud inserting mechanism for securing together the hub and drum of an assembly at said second station by inserting studs thereinto, unloading mechanism for removing from its support a hub and drum assembly at said third station, intermittently operated means for rotating said turntable angular increments corresponding to the angular spacing between said supports to move said supports past said first, second and third stations in succession and momentarily stopping with a support at each station, means for operating said mechanisms at approximately the same time between each intermittent interval of rotation of said turntable, and means beyond said third station operated by a hub and drum assembly on a support moving beyond said third station for rendering inoperative said mechanisms and said intermittently operated means.

4. A machine for securing together wheel hub and brake drum assemblies and for assembling bearing cups with the hubs of the assemblies, comprising a rotatable turntable, supports on said turntable arranged in equal angularly spaced relation about the axis of rotation of said turntable adapted to firmly support hub and drum assemblies with the hub and drum predeterminedly related to each other, angularly spaced first, second and third stations adjacent said turntable, bearing cup assembling mechanism for assembling a pair of bearing cups with the hub of a hub and drum assembly at said first station, stud inserting mechanism for securing together the hub and drum of an assembly at said second station by inserting studs thereinto, unloading mechanism for removing from its support a hub and drum assembly at said third station, intermittently operated means for rotating said turntable angular increments corresponding to the angular spacing between said supports to move said supports past said first, second and third stations in succession and momentarily stopping with a support at each station, means for operating said mechanisms at approximately the same time between each intermittent interval of rotation of said turntable and returning said mechanisms to an inactive condition in preparation for the next operation thereof, and means operated upon the failure of any one of said mechanisms to return to its inactive condition for rendering inoperative all of said mechanisms and said intermittently operated means.

5. A machine for securing together wheel hub and brake drum assemblies and for assembling bearing cups with the hubs of the assemblies, comprising a plurality of supports spaced apart equal distances along a predetermined path and adapted to firmly support hub and drum assemblies with the hub and drum of each assembly predeterminedly related to each other, first, second and third stations along said path, bearing cup assembling mechanism for assembling a bearing cup with the hub of a hub and drum assembly at said first station, mechanism for securing together the hub and drum of an assembly at said second station, mechanism for loosening a hub and drum assembly relative to its support at said third station, intermittently operated means for moving said supports along said path increments corresponding to the spacing between said supports to move said supports passed said first, second and third stations in succession and momentarily stopping with a support at each station, means for operating said mechanisms at approximately the same time between each interval of movement of said supports, and unloading mechanism operable between successive intervals of movement of said supports for removing from its support a hub and drum assembly that had been loosened by said loosening mechanism.

6. A machine as defined in claim 5 in which said unloading mechanism is responsive to the operation of said loosening mechanism for removing an assembly at said third station.

7. A machine for securing together wheel hub and brake drum assemblies and for assembling bearing cups with the hubs of the assemblies, comprising a plurality of supports spaced apart equal distances along a predetermined path and adapted to firmly support hub and drum assemblies with the hub and drum of each assembly predeterminedly related to each other, first, second and third stations along said path, bearing cup assembly mechanism for assembling a bearing cup with the hub of a hub and drum assembly at said first station, mechanism for securing together the hub and drum of an assembly at said second station, unloading mechanism for removing from its support a hub and drum assembly at said third station, intermittently operated means for moving said supports along said path increments corresponding to the spacing between said supports to move said supports passed said first, second and third stations in succession and momentarily stopping with a support at each station, means for operating said mechanisms at approximately the same time between each intermittent interval of movement of said supports, a loading station along said path in advance of said first station for loading a hub and drum assembly on a support, and means between said loading station and said first station responsive to the absence of a hub and drum assembly on the support moving between the latter stations for rendering inoperative said mechanisms and said intermittently operated means.

8. A machine for securing together wheel hub and brake drum assemblies and for assembling bearing cups with the hubs of the assemblies, comprising a plurality of supports spaced apart equal distances along a predetermined path and adapted to firmly support hub and drum assemblies with the hub and drum of each assembly predeterminedly related to each other, first, second and third stations along said path, bearing cup assembling mechanism for assembling a bearing cup with the hub of a hub and drum assembly at said first station, mechanism for securing together the hub and drum of an assembly at said second station, unloading mechanism for removing from its support a hub and drum assembly at said third station, intermittently operated means for moving said supports along said path increments corresponding to the spacing between said supports to move said supports passed said first, second and third stations in succession and momentarily stopping with a support at each station, means for operating said mechanisms at approximately the same time between each intermittent interval of movement of said supports, and means beyond said third station operated by a hub and drum assembly on a support moving beyond said third station for rendering inoperative said mechanisms and said intermittently operated means.

9. A machine for securing together wheel hub and brake drum assemblies and for assembling bearing cups with the hubs of the assemblies, comprising a plurality of supports spaced apart equal distances along a predetermined path and adapted to firmly support hub and drum assemblies with the hub and drum of each assembly predeterminedly related to each other, first, second and third stations along said path, bearing cup assembly mechanism for assembling a bearing cup with the hub of a hub and drum assembly at said first station, mechanism for securing together the hub and drum of an assembly at said second station, unloading mechanism for removing from its support a hub and drum assembly at said third station, intermittently operated means for moving said supports along said path increments corresponding to the spacing between said supports to move said supports passed said first, second and third stations in succession and momentarily stopping with a support at each station, means for operating said mechanisms at approximately the same time between each intermittent interval of movement of said supports, and returning said mechanisms to an inactive condition in preparation for the next operation thereof, and means operated upon the failure of any one of said mechanisms to return to its inactive condition for rendering inoperative all of said mechanisms and said intermittently operated means.

References Cited in the file of this patent

UNITED STATES PATENTS

| | | |
|---|---|---|
| 828,396 | Fraser | Aug. 14, 1906 |
| 1,606,432 | Herkenhine | Nov. 9, 1926 |
| 1,723,369 | Pew | Aug. 6, 1929 |
| 1,753,560 | Emmert | Apr. 8, 1930 |
| 1,904,708 | Adams | Apr. 18, 1933 |
| 2,155,958 | Schmidt | Apr. 25, 1939 |
| 2,210,615 | Brown | Aug. 6, 1940 |
| 2,222,605 | Carlson | Nov. 26, 1940 |
| 2,270,300 | Hothersall | Jan. 20, 1942 |
| 2,554,982 | Hartley | May 29, 1951 |
| 2,559,369 | Phillips | July 3, 1951 |
| 2,604,692 | Broden | July 29, 1952 |
| 2,674,755 | Schlicksupp | Apr. 13, 1954 |
| 2,698,478 | Heisterkamp | Jan. 4, 1955 |